US008526509B2

(12) United States Patent
Norkin et al.

(10) Patent No.: US 8,526,509 B2
(45) Date of Patent: Sep. 3, 2013

(54) DEBLOCKING FILTERING

(75) Inventors: Andrey Norkin, Solna (SE); Kenneth Andersson, Gävle (SE); Rickard Sjöberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/583,437

(22) PCT Filed: Oct. 6, 2011

(86) PCT No.: PCT/SE2011/051199
§ 371 (c)(1),
(2), (4) Date: Sep. 7, 2012

(87) PCT Pub. No.: WO2012/096610
PCT Pub. Date: Jul. 19, 2012

(65) Prior Publication Data
US 2013/0003865 A1    Jan. 3, 2013

Related U.S. Application Data

(66) Substitute for application No. 61/432,751, filed on Jan. 14, 2011.

(51) Int. Cl.
*H04N 7/12* (2006.01)
(52) U.S. Cl.
USPC .................................................. 375/240.29
(58) Field of Classification Search
USPC .................................................. 375/240.29
See application file for complete search history.

(56) References Cited

U.S. PATENT DOCUMENTS

2008/0117980 A1    5/2008    Hung et al.
2008/0123750 A1    5/2008    Bronstein et al.

FOREIGN PATENT DOCUMENTS

| WO | 02096117 A1 | 11/2002 |
| WO | 2010080645 A2 | 7/2010 |
| WO | 2011096869 A1 | 8/2011 |

OTHER PUBLICATIONS

Chun-Lung Hsu; Yu-Sheng Huang, "A Fast-Deblocking Boundary-strength Based Architecture Design of Deblocking Filter in H.264/AVC Applications", Journal of Signal Processing Systems ; for Signal, Image, and Video Technology (formerly the Journal of VLSI Signal Processing Systems for Signal, Image, and Video Technology), 20071120, Springer US, Boston, ISSN 1939-8115; whole document.

Ugur, K et al, "High Performance, Low Complexity Video Coding and the Emerging HEVC Standard", In: IEEE Transactions on Circuits and Systems for Video Technology, vol. 20 Issue:12, On pp. 1688-1697, ISSN: 1051-8215, Digital Object Identifier: 10.1109/TCSVT.2010.2092613, Date of Publication: Nov. 18, 2010; whole document.

*Primary Examiner* — Richard Torrente
(74) *Attorney, Agent, or Firm* — Rothwell, Figg, Ernst & Manbeck, P.C.

(57) ABSTRACT

Blocking artifacts at a block boundary (1) between a block (10) and a neighboring block (20) in a video frame are reduced by calculating an offset based on pixel values of pixels (11, 13) in a line (12) of pixels (11, 13, 15, 17) in the block (10) and based on pixel values of pixels (21, 23) in a corresponding line (22) of pixels (21, 23, 25, 27) in the neighboring block (20). The offset is added to the pixel value of the pixel (11) closest to the block boundary (1) in the line (12) of pixels (11, 13, 15, 17) and is subtracted from the pixel value of the pixel (21) closest to the block boundary (1) in the corresponding line (22) of pixels (21, 23, 25, 27). The resulting deblocking filter has good low-pass characteristics and is efficient for reducing blocking artifact.

24 Claims, 7 Drawing Sheets

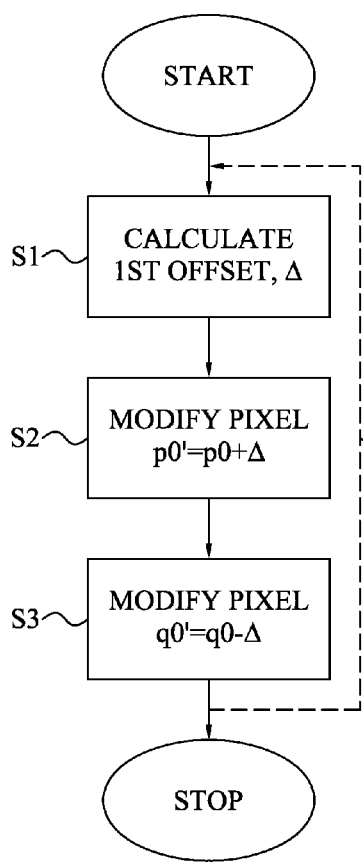
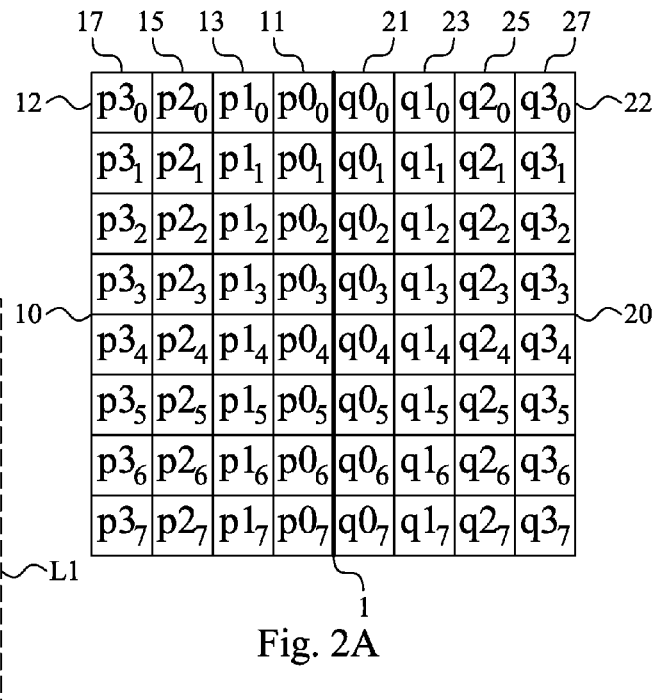
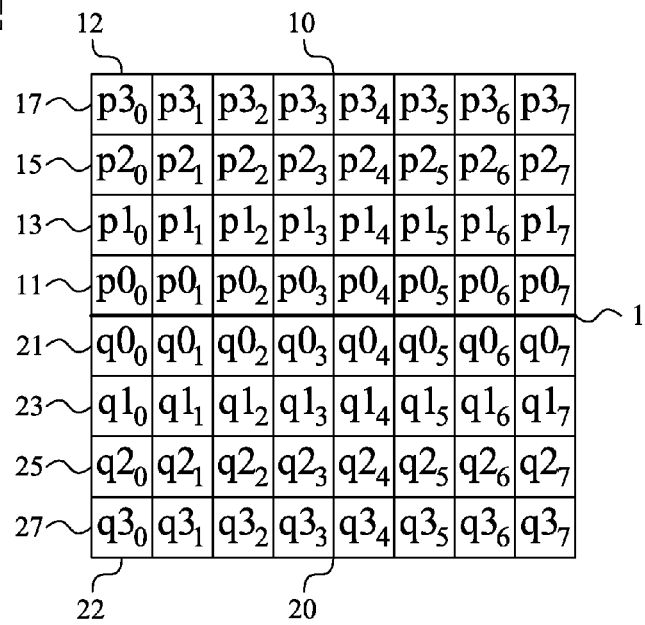
Fig. 1
Fig. 2A
Fig. 2B

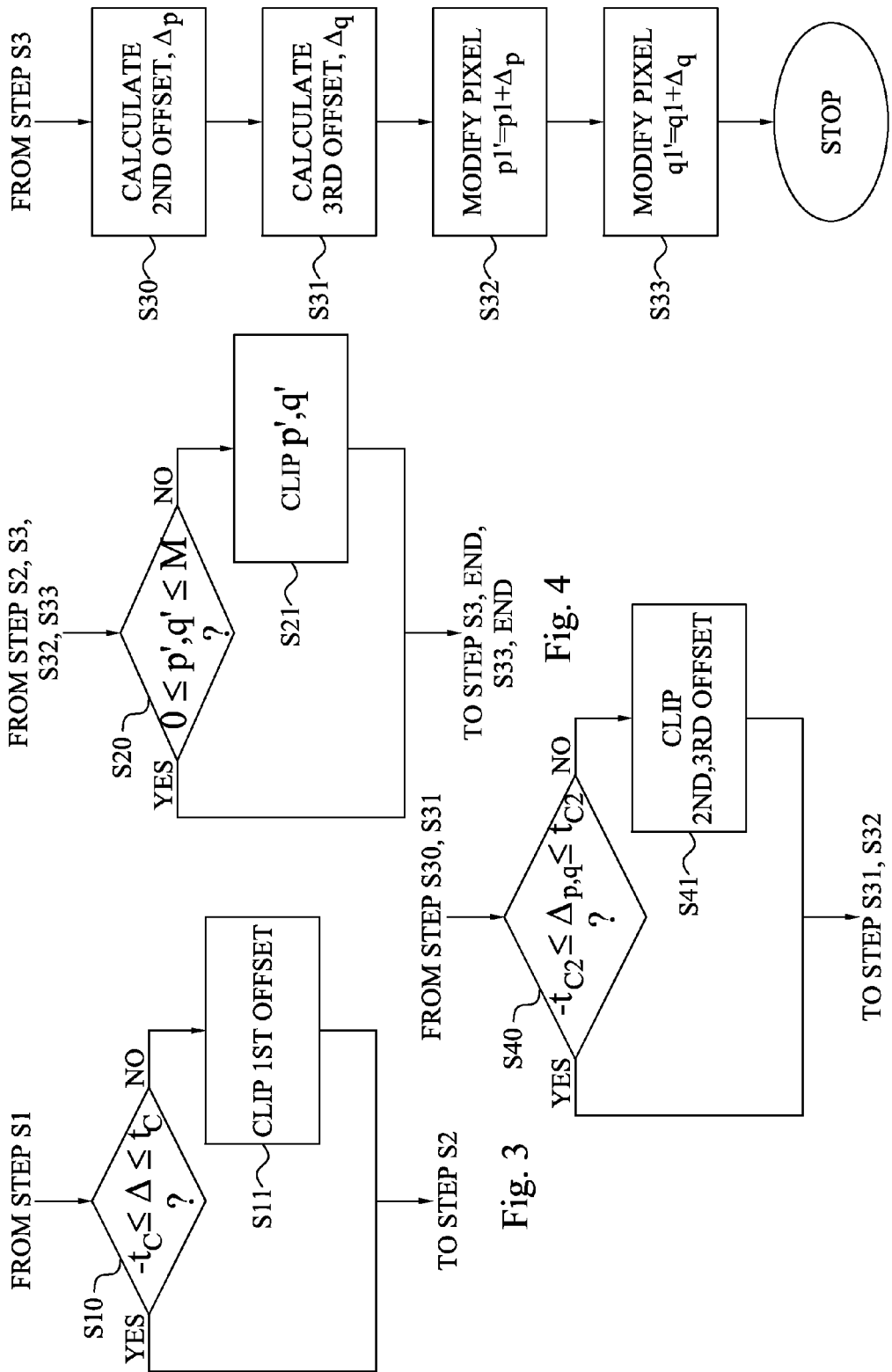

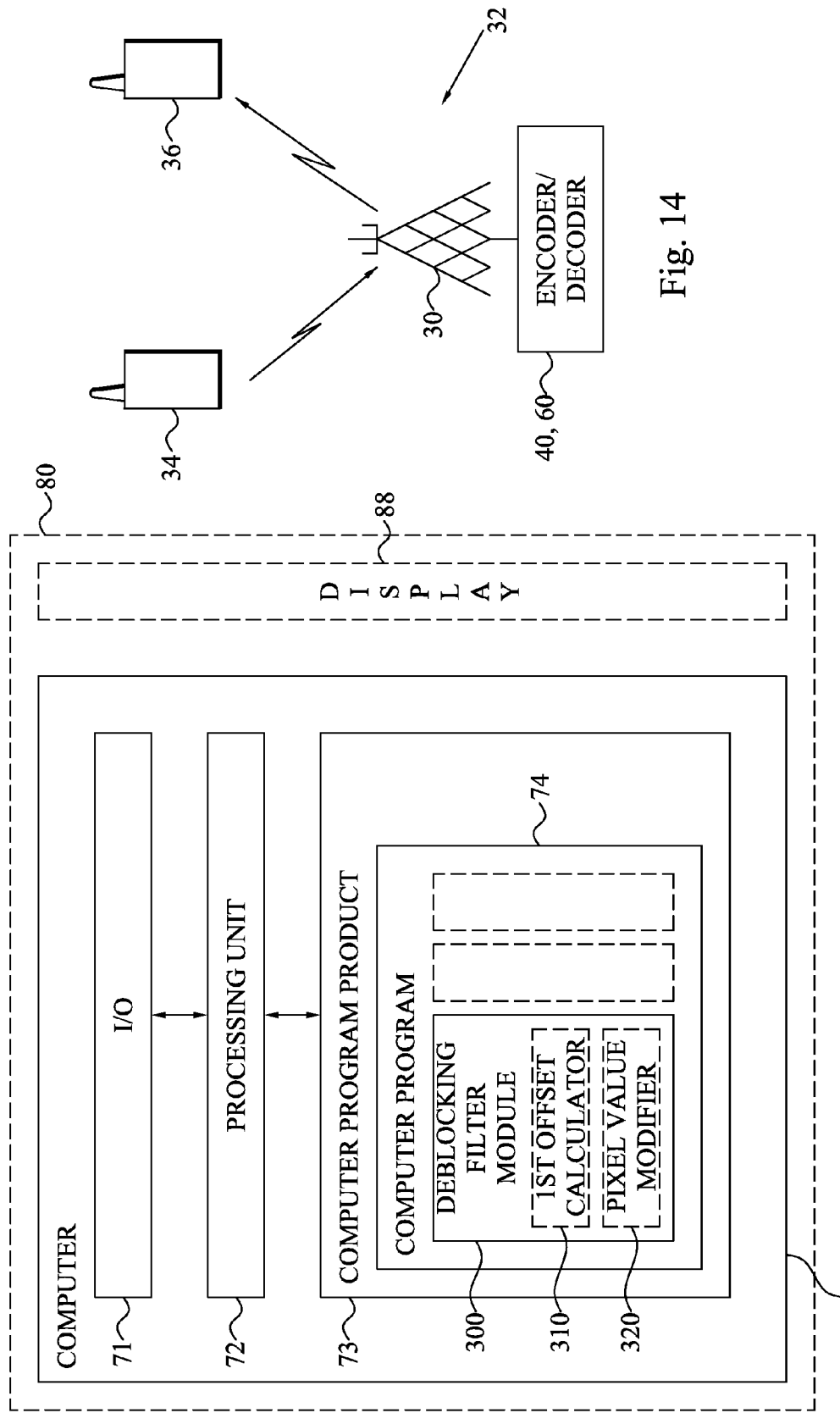

DEBLOCKING FILTERING

CROSS REFERENCE TO RELATED APPLICATION(S)

This application is a 35 U.S.C. §371 National Phase Entry Application from PCT/SE2011/051199, filed Oct. 6, 2011, designating the United States, which claims the benefit of U.S. Provisional Ser. No. 61/432,751 filed Jan. 14, 2011. The above identified applications are incorporated by reference herein in their entirety.

TECHNICAL FIELD

The present description relates to deblocking filtering for reducing blocking artifacts at block boundaries.

BACKGROUND

Deblocking filters are used in the video coding standards in order to combat blocking artifacts. The blocking artifacts arise because the original video is split into blocks which are processed relatively independently. The blocking artifacts can, for instance, arise due to different intra predictions of the blocks, quantization effects and motion compensation. Two particular variants of deblocking are described below.

H.264 Deblocking

In state of the art video coding, such as H.264, there is a deblocking filter, also denoted loop filter, after prediction and residual reconstruction, but before storage of the reconstruction for later reference when encoding or decoding the subsequent frames. The deblocking filtering consists of several steps such as filter decisions, filtering operations, a clipping function and changes of pixel values. The decision to filter the border or not is made based on evaluation of several conditions. Filter decisions depend on macroblock (MB) type, motion vector (MV) difference between neighboring blocks, whether neighboring blocks have coded residuals and on the local structure of the current and/or neighboring blocks.

Then the amount of filtering for a pixel depends, among others, on the position of that pixel relative to the block border or boundary and on the quantization parameter (QP) value used for residual coding.

The filter decision is based on comparing three pixel differences with three thresholds. The thresholds are adapted to the quantization parameter (QP). For instance, assume a vertical block boundary of $$abcd|efgh$$

where a, b c and d denote the pixel values of the pixels of a row of pixels in the current block with e, f, g and h denoting the corresponding pixel values of the pixels of a corresponding row of pixels in the neighboring block. If the following conditions are fulfilled the filter decision is positive, e.g. abs(d−e)<thr1, abs(c−d)<thr2, and abs(e−f)<thr2, where thr1 and thr2 are adapted based on QP.

There are two filtering modes in H.264. In the first filtering mode, referred to as normal filtering, filtering can be described with a delta value with which filtering changes the current value with. The filtering for the pixels closest to the block boundary is d'=d+delta and e'=e−delta, where delta has been clipped off to a threshold±thr3 to a value that is constrained by the QP. More filtering is thereby allowed for high QP than for low QP. Clipping can be described as delta_clipped=max(−thr3, min(thr3, delta)), where thr3 is controlling the filter strength. A larger value of thr3 means that the filtering is stronger which means that a stronger low-pass filtering effect will happen.

The filter strength can be increased if any of the following two conditions also holds, e.g. abs(b−d)<thr2 and abs(e−g)<thr2. The filter strength is adapted by clipping the delta less, e.g. allow for more variation.

The second filtering mode, referred to as strong filtering, is applied for intra macroblock boundaries only, when the following condition is fulfilled abs(d−e)<thr1/4.

For more information of deblocking filtering in H.264 reference is made to List et al., Adaptive Deblocking Filter, *IEEE Transactions on Circuits and Systems for Video Technology*, vol. 13, no. 7, July 2003.

Deblocking in HEVC Draft

In the draft HEVC (High Efficiency Video Coding) specification "Test Model under Consideration", ITU-T SG16 WP3 document, JCTVC-B205, Chapter 6.5 In-loop filter process, the deblocking filter works differently from H.264. The filtering is performed if at least one of the blocks on the side of the boundary is intra, or has non-zero coefficients, or the difference between the motion vector components of the blocks is greater or equal to one integer pixel. For example, when filtering the border between the blocks with a vertical block boundary of $$p3_i p2_i p1_i p0_i | q0_i q1_i q2_i q3_i$$

with $pj_i$ denoting the pixel value of pixel number j of row number i in the current block and $qj_i$ denoting the pixel value of pixel number j of row number i in the neighboring block, i=0 ... 7, j=0 ... 3, then the following condition should also be satisfied:

$$d=|p2_2-2\times p1_2+p0_2|+\star q2_2-2\times q1_2+q0_2|+|p2_5-2\times p1_5+p0_5|+|q2_5-2\times q1_5+q0_5|<\beta$$

where β depends on QP. In the above mentioned HEVC specification, there is a table of β, where β increases with QP.

If the conditions are fulfilled and filtering is done between the current block and the neighboring block, one of two types of filtering is performed, referred to as weak and strong filtering, respectively. The choice between the strong and the weak filtering is done separately for each line depending on the following conditions. For each line i=0 ... 7, the strong filtering is performed if all the following conditions are true, otherwise, weak filtering is performed:

$$d<(\beta>>2)$$

$$(|p3_i-p0_i|+|q0_i-q3_i|)<(\beta>>3)$$

$$|p0_i-q0_i|<((5\times t_C+1)>>1)$$

where $t_C$ and β depend on QP and >> denotes a right shift operator.

Weak Filtering in HEVC Draft

Weak filtering is performed based on the above conditions. The actual filtering works by computing an offset (Δ), adding it to the original pixel value and clip the sum to a filtered output pixel value in the range of 0-255:

$$\Delta=\text{Clip}(-t_C,t_C,(13\times(q0_i-p0_i)+4\times(q1_i-p1_i)-5\times(q2_i-p2_i)+16)>>5))$$

$$p0_i=\text{Clip}_{0-255}(p0_i+\Delta)$$

$$q0_i=\text{Clip}_{0-255}(p0_i+\Delta)$$

$$p1_i=\text{Clip}_{0-255}(p1_i+\Delta/2)$$

$$q1_i=\text{Clip}_{0-255}(q1_i-\Delta/2)$$

where the clip function Clip(A, B, x) is defined as Clip(A, B, x)=A if x<A, Clip(A, B, x)=B if x>B and Clip(A, B, x)=x if A≦x≦B and Clip$_{0\text{-}255}$(x) is defined as Clip(0, 255, x).

Strong Filtering in HEVC Draft

Strong filtering mode is performed by the following set of operations:

$p0_i$=Clip$_{0\text{-}255}$(($p2_i$+2×$p1_i$+2×$p0_i$+2×$q0_i$+$q1_i$+4)>>3)

$q0_i$=Clip$_{0\text{-}255}$(($p1_i$+2×$p0_i$+2×$q0_i$+2×$q1_i$+$q2_i$+4)>>3)

$p1_i$=Clip$_{0\text{-}255}$(($p2_i$+$p1_i$+$p0_i$+$q0_i$+2)>>2)

$q1_i$=Clip$_{0\text{-}255}$(($p0_i$+$q0_i$+$q1_i$+$q2_i$+2)>>2)

$p2_i$=Clip$_{0\text{-}255}$((2×$p3_i$+3×$p2_i$+$p1_i$+$p0_i$+$q0_i$+4)>>3)

$q2_i$=Clip$_{0\text{-}255}$(($p0_i$+$q0_i$+$q1_i$+3×$q2_i$+2×$q3_i$+4)>>3)

One problem with the deblocking in HEVC is that the weak filter does not have good low-pass characteristics. One can see that the first and the second pixels from the block border are modified by adding or subtracting Δ and Δ/2 respectively. Such a filter cannot remove high frequencies that can appear near the block border and cannot remove ringing. Moreover, the frequency characteristics of the filter in HEVC show slight amplifications of higher frequencies when filtering the second pixel ($p1_i$ and $q1_i$) from the block boundary, which can result in worse rate-distortion (RD) performance of the coder. Moreover, the offset for pixel $p1_i$ is equal in magnitude to the offset of pixel $q1_i$ although the structure of the signal can be different on different sides of the block boundary. Therefore, the HEVC filter does not adapt well to the local structure of the side of the block boundary.

Hence, there is a need for an efficient deblocking filter that can be used to reduce blocking artifacts at block boundaries and that does not have the above mentioned drawbacks.

SUMMARY

It is a general objective to combat blocking artifacts at block boundaries between blocks of pixels in a video frame.

This and other objectives are met by embodiments as disclosed herein.

An aspect of the embodiments defines a method of reducing blocking artifacts at a block boundary between a block of pixels and a neighboring block of pixels in a video frame. The method calculates a first offset to be based on (9×(q0−p0)−3×(q1−p1))/16, wherein p0 denotes a pixel value of a pixel closest to the block boundary in a line of pixels in the block, p1 denotes a pixel value of a pixel next closest to the block boundary in the line of pixels, q0 denotes a pixel value of a pixel closest to the block boundary in a corresponding line of pixels in the neighboring block and q1 denotes a pixel value of a pixel next closest to the block boundary in the corresponding line of pixels. The line of pixels and the corresponding line of pixels are perpendicular to the block boundary. The pixel value of the pixel closest to the block boundary in the line of pixels is modified by adding the first offset to the pixel value of this pixel to form a modified pixel value. Correspondingly, the pixel value of the pixel closest to the block boundary but in the corresponding line of pixels is modified by subtracting the first offset from the pixel value of this pixel to form a modified pixel value.

In an optional embodiment of this aspect, the first offset is calculated to be equal to (9×(q0−p0)−3×(q1−p1)+8)>>4, wherein >> denotes a right shift operation.

In an optional embodiment of this aspect, the method further comprises clipping the first offset to be within an interval of −$t_C$ and $t_C$ by setting the first offset to be equal to −$t_C$ if the first offset is smaller than −$t_C$ and by setting the first offset to be equal to $t_C$ if the first offset is larger than $t_C$, wherein $t_C$ is a threshold value that is dependent on a quantization parameter value assigned to the block.

In an optional embodiment of this aspect, the method further comprises clipping the modified pixel value of the pixel closest to said block boundary in the line of pixels to be within an interval of zero and a defined maximum value and clipping the modified pixel value of the pixel closest to the block boundary in the corresponding line of pixels to be within an interval of zero and the defined maximum value. This optional clipping is achieved by setting the modified pixel value to be equal to zero if the modified pixel value is smaller than zero and by setting the modified pixel value to be equal to the defined maximum value if the modified pixel value is larger than the defined maximum value.

In an optional embodiment of this aspect, the method further comprises calculating a second offset to be based on (p2+p0−2×p1+2×Δ)/4, wherein p2 denotes a pixel value of a pixel second next closest to the block boundary in the line of pixels and Δ denotes the first offset. The method also comprises, in this optional embodiment, calculating a third offset to be based on (q2+q0−2×q1−2×Δ)/4, wherein q2 denotes a pixel value of a pixel second next closest to the block boundary in the corresponding line of pixels. The pixel value of the pixel next closest to the block boundary in the line of pixels is then modified by adding the second offset to the pixel value of the pixel next closest to the block boundary in the line of pixels to form a modified pixel value. Correspondingly, the method also comprises, in this optional embodiment, modifying the pixel value of the pixel next closest to the block boundary in the corresponding line of pixels by adding the third offset to the pixel value of the pixel next closest to the block boundary in the corresponding line of pixels to form a modified pixel value.

In an optional embodiment of this aspect, the second offset is calculated to be equal to (((p2+p0+1)>>1)−p1+Δ)−1, wherein >> denotes a right shift operation and the third offset is calculated to be equal to (((q2+q0+1)>>1)−q1−Δ)>>1.

In an optional embodiment of this aspect, the method further comprises clipping the second offset within an interval of −$t_{C2}$ and $t_{C2}$ and clipping the third offset within an interval of −$t_{C2}$ and $t_{C2}$, wherein $t_{C2}$ is a threshold value that is dependent on a quantization parameter value assigned to the block. This optional clipping is achieved by setting the second or third offset to be equal to −$t_{C2}$ if the second or third offset is smaller than −$t_{C2}$ and by setting the second or third offset to be equal to $t_{C2}$ if the second or third offset is larger than $t_{C2}$.

In an optional embodiment of this aspect, the method further comprises clipping the modified pixel value of the pixel next closest to the block boundary in the line of pixels within an interval of zero and a defined maximum value and clipping the modified pixel value of the next pixel closest to the block boundary in the corresponding line of pixels within an interval of zero and the defined maximum value. This optional clipping is achieved by setting the modified pixel value to be equal to zero if the modified pixel value is smaller than zero and by setting the modified pixel value to be equal to the defined maximum value if the modified pixel value is larger than the defined maximum value.

In an optional embodiment of this aspect, the method further comprises calculating a fourth offset to be based on (p3+p1−2×p2+2×$Δ_{p1}$)/4, wherein p3 denotes a pixel value of a pixel third next closest to the block boundary in the line of pixels and $Δ_{p1}$ denotes the second offset. The method also comprises, in this optional embodiment, calculating a fifth offset to be based on $(q3+q1-2\times q2+2\times \Delta_{q1})/4$, wherein $q3$ denotes a pixel value of a pixel third closest to the block boundary in the corresponding line of pixels and $\Delta_{q1}$ denotes the third offset. The pixel value of the pixel second next closest to the block boundary in the line of pixels is modified by adding the fourth offset to the pixel value of the pixel second next closest to the block boundary in the line of pixels to form a modified pixel value. The method also comprises, in this optional embodiment, modifying the pixel value of the pixel second next closest to the block boundary in the corresponding line of pixels by adding the fifth offset to the pixel value of the pixel second next closest to the block boundary in the corresponding line of pixels to form a modified pixel value.

In an optional embodiment of this aspect, the fourth offset is calculated to be equal to $(((p3+p1+1)>>1)-p2+\Delta_{p1})>>1$, wherein $>>$ denotes a right shift operation and the fifth offset is calculated to be equal to $(((q3+q1+1)>>1)-q2+\Delta_{q1})>>1$.

In an optional embodiment of this aspect a deblocking filter unit calculates the first offset to be based on $(9\times(q0-p0)-3\times(q1-p1))/16$. The deblocking filter unit modifies the pixel value of the pixel closest to the block boundary in the line of pixels by adding the first offset to the pixel value of the pixel closest to the block boundary in the line of pixels to form a modified pixel value. The deblocking filter unit also modifies the pixel value of the pixel closest to the block boundary in the corresponding line of pixels by subtracting the first offset from the pixel value of the pixel closest to the block boundary in the corresponding line of pixels to form a modified pixel value.

Another aspect of the embodiments defines a deblocking filter unit for reducing blocking artifacts at a block boundary between a block of pixels and a neighboring block of pixels in a video frame. The deblocking filter unit comprises a first offset calculator configured to calculate a first offset to be based on $(9\times(q0-p0)-3\times(q1-p1))/16$, wherein $p0$ denotes a pixel value of a pixel closest to the block boundary in a line of pixels in the block, $p1$ denotes a pixel value of a pixel next closest to the block boundary in the line of pixels, $q0$ denotes a pixel value of a pixel closest to the block boundary in a corresponding line of pixels in the neighboring block and $q1$ denotes a pixel value of a pixel next closest to the block boundary in the corresponding line of pixels. The line of pixels and the corresponding line of pixels are perpendicular to the block boundary. The deblocking filter unit also comprises a pixel value modifier configured to modify the pixel value of the pixel closest to the block boundary in the line of pixels by adding the first offset to the pixel value of this pixel to form a modified pixel value. The pixel value modifier is also configured to modify the pixel value of the pixel closest to the block boundary but in the corresponding line of pixels by subtracting the first offset from the pixel value of this pixel to form a modified pixel value.

In an optional embodiment of this aspect, the first offset calculator is configured to calculate the first offset to be equal to $(9\times(q0-p0)-3\times(q1-p1)+8)>>4$, wherein $>>$ denotes a right shift operation.

In an optional embodiment of this aspect, the deblocking filter unit comprises a first clipping unit configured to clip the first offset to be within an interval of $-t_C$ and $t_C$ by setting the first offset to be equal to $-t_C$ if the first offset is smaller than $-t_C$ and by setting the first offset to be equal to $t_C$ if the first offset is larger than $t_C$, wherein $t_C$ is a threshold value that is dependent on a quantization parameter value assigned to the block.

In an optional embodiment of this aspect, the deblocking filter unit comprises a second clipping unit configured to clip the modified pixel value of the pixel closest to the block boundary in the line of pixels within an interval of zero and a defined maximum value, and clip the modified pixel value of the pixel closest to the block boundary in the corresponding line of pixels within an interval of zero and the defined maximum value. This optional clipping by the optional second clipping unit is achieved by setting the modified pixel value to be equal to zero if the modified pixel value is smaller than zero and by setting the modified pixel value to be equal to the defined maximum value if the modified pixel value is larger than the defined maximum value.

In an optional embodiment of this aspect, the deblocking filter unit comprises a second offset calculator configured to calculate a second offset to be based on $(p2+p0-2\times p1+2\times\Delta)/4$, wherein $p2$ denotes a pixel value of a pixel second next closest to the block boundary in the line of pixels and $\Delta$ denotes the first offset. The deblocking filter unit also comprises, in this optional embodiment, a third offset calculator configured to calculate a third offset to be based on $(q2+q0-2\times q1-2\times\Delta)/4$, wherein $q2$ denotes a pixel value of a pixel second next closest to the block boundary in the corresponding line of pixels. In this optional embodiment the pixel value modifier is configured to modify the pixel value of the pixel next closest to the block boundary in the line of pixels by adding the second offset to the pixel value of the pixel next closest to the block boundary in the line of pixels to form a modified pixel value, and to modify the pixel value of the pixel next closest to the block boundary in the corresponding line of pixels by adding the third offset to the pixel value of the pixel next closest to the block boundary in the corresponding line of pixels to form a modified pixel value.

In an optional embodiment of this aspect, the second offset calculator is configured to calculate the second offset to be equal to $4(p2+p0+1)>>1)-p1+\Delta)>>1$, wherein $>>$ denotes a right shift operation, and the third offset calculator is configured to calculate the third offset to be equal to $(((q2+q0+1)>>1)-q1-\Delta)>>1$.

In an optional embodiment of this aspect, the deblocking filter unit comprises a third clipping unit configured to clip the second offset within an interval of $-t_{C2}$ and $t_{C2}$, and clip the third offset within an interval of $-t_{C2}$ and $t_{C2}$, wherein $t_{C2}$ is a threshold value that is dependent on a quantization parameter value assigned to the block. This optional clipping by the optional third clipping unit is achieved by setting the second or third offset to be equal to $-t_{C2}$ if the second or third offset is smaller than $-t_{C2}$ and by setting the second or third offset to be equal to $t_{C2}$ if the second or third offset is larger than $t_{C2}$.

In an optional embodiment of this aspect, the deblocking filter unit comprises a second clipping unit configured to clip the modified pixel value of the pixel next closest to the block boundary in the line of pixels within an interval of zero and a defined maximum value, and clip the modified pixel value of the next pixel closest to the block boundary in the corresponding line of pixels within an interval of zero and the defined maximum value. This optional clipping by the optional second clipping unit is achieved by setting the modified pixel value to be equal to zero if the modified pixel value is smaller than zero and by setting the modified pixel value to be equal to the defined maximum value if the modified pixel value is larger than the defined maximum value.

In an optional embodiment of this aspect, the deblocking filter unit comprises a fourth offset calculator configured to calculate a fourth offset to be based on $(p3+p1-2\times p2+2\times\Delta_{p1})/4$, wherein $p3$ denotes a pixel value of a pixel third next closest to the block boundary in the line of pixels and $\Delta_{p1}$ denotes the second offset. The deblocking filter unit also comprises, in this optional embodiment, a fifth offset calculator configured to calculate a fifth offset to be based on $(q3+q1-2 \times q2+2 \times \Delta_{q1})/4$, wherein q3 denotes a pixel value of a pixel third closest to the block boundary in the corresponding line of pixels and $\Delta_{q1}$ denotes the third offset. In this optional embodiment the pixel value modifier is configured to modify the pixel value of the pixel second next closest to the block boundary in the line of pixels by adding the fourth offset to the pixel value of the pixel second next closest to the block boundary in the line of pixels to form a modified pixel value, and modify the pixel value of the pixel second next closest to the block boundary in the corresponding line of pixels by adding the fifth offset to the pixel value of the pixel second next closest to the block boundary in the corresponding line of pixels to form a modified pixel value.

In an optional embodiment of this aspect, the fourth offset calculator is configured to calculate the fourth offset to be equal to $(((p3+p1+1)-1)>>p2+\Delta_{p1})>>1$, wherein >> denotes a right shift operation, and the fifth offset calculator is configured to calculate the fifth offset to be equal to $(((q3+q1+1)>>1)-q2+\Delta_{q1})>>1$.

Further aspects of the embodiments define an encoder and a decoder, respectively, comprising a deblocking filter unit as defined above.

Furthermore, an aspect of the embodiments defines a user equipment comprising a memory configured to stored encoded video frames, a decoder as defined above configured to decode the encoded video frames into decoded video frames and a media player configured to render the decoded video frames into video data that is displayable on a display.

Another aspect defines a network device being or belonging to a network node in a communication network between a sending unit and a receiving user equipment. The network device comprises an encoder and/or a decoder as defined above.

A further aspect of the embodiments defines a computer program for reducing blocking artifacts at a block boundary between a block of pixels and a neighboring block of pixels in a video frame. The computer program comprises code means which when run on a computer causes the computer to calculate an offset to be based on $(9 \times (q0-p0)-3 \times (q1-p1))/16$, wherein p0 denotes a pixel value of a pixel closest to the block boundary in a line of pixels in the block, p1 denotes a pixel value of a pixel next closest to the block boundary in the line of pixels, q0 denotes a pixel value of a pixel closest to the block boundary in a corresponding line of pixels in the neighboring block and q1 denotes a pixel value of a pixel next closest to the block boundary in the corresponding line of pixels. The line of pixels and the corresponding line of pixels are perpendicular to the block boundary. The computer is also caused to modify the pixel value of the pixel closest to the block boundary in the line of pixels by adding the offset to the pixel value of this pixel. The code means further causes the computer to modify the pixel value of the pixel closest to the block boundary in the corresponding line of pixels by subtracting the offset from the pixel value of this pixel.

Yet another aspect of the embodiments defines a computer program product comprising computer readable code means and a computer program as defined above stored on the computer readable means.

The present embodiments enable efficient reduction in blocking artifacts and also have good low-pass characteristics.

BRIEF DESCRIPTION OF THE DRAWINGS

The invention, together with further objects and advantages thereof, may best be understood by making reference to the following description taken together with the accompanying drawings, in which:

FIG. 1 is a flow diagram illustrating a method of reducing blocking artifacts according to an embodiment;

FIGS. 2A and 2B illustrate two embodiments of neighboring blocks and a block boundary over which de-blocking filtering can be applied;

FIG. 3 is a flow diagram illustrating additional, optional steps of the method in FIG. 1 according to an embodiment;

FIG. 4 is a flow diagram illustrating additional, optional steps of the method in FIGS. 1 and 5 according to an embodiment;

FIG. 5 is a flow diagram illustrating additional, optional steps of the method in FIG. 1 according to another embodiment;

FIG. 6 is a flow diagram illustrating additional, optional steps of the method in FIG. 5 according to an embodiment;

FIG. 10 is a schematic block diagram of a software implementation of a deblocking filter module in a computer according to an embodiment;

FIG. 14 is a schematic overview of a portion of a communication network comprising a network device according to an embodiment.

DETAILED DESCRIPTION

Figure 9:
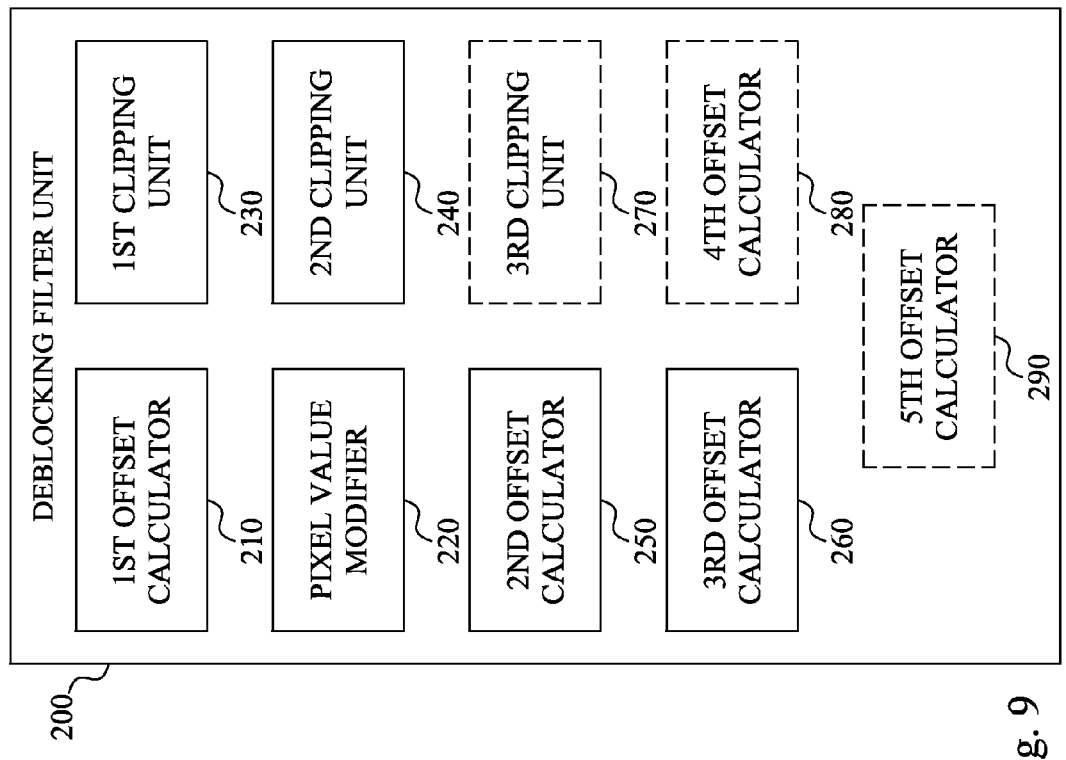
FIG. 9 is a schematic block diagram of a deblocking filter unit according to another embodiment.

Throughout the drawings, the same reference numbers are used for similar or corresponding elements.

The embodiments generally relate to deblocking filtering to combat blocking artifacts over block boundaries in a video frame. The embodiments use a deblocking filter that has good frequency characteristics. The present deblocking filter is configured not to modify the pixel values over a block boundary if these pixel values form a ramp but smooth the pixel values if they instead are in the form of a step. This implies that the deblocking filter will have good lowpass characteristics and can remove high frequencies that can appear near the block boundary.

FIG. 1 is a flow diagram of a method of reducing blocking artifacts at a block boundary between a block of multiple pixels and a neighboring block of multiple pixels in a video frame according to an embodiment. As is well-known in the art, a video frame is divided into non-overlapping blocks of pixels that are encoded and decoded according to the various available intra and inter coding modes. Generally, a video frame is divided into non-overlapping macroblocks of 16×16 pixels. Such a macroblock can in turn be divided into smaller blocks of different sizes, such as 4×4 or 8×8 pixels. However, also rectangular blocks could be possible according to the embodiments, such as, 4×8, 8×4, 8×16 or 16×8. The embodiments can be applied to any such block of pixels, including macroblocks or even larger blocks of pixels.

In the emerging High Efficiency Video Coding (HEVC) standard, coding units (CU), prediction units (PU) and transform units (TU) are used. The prediction units are defined inside a coding unit and contain the intra or inter prediction modes. Transform units are defined inside a coding unit and the largest transform size is 32×32 pixels and the smallest size is 4×4 pixels. The CU size is currently varying from 64×64 pixels (largest) to 4×4 pixels (smallest). In this way, the largest CU can be split into smaller CUs with the "level of granularity" depending on the local characteristics of the frame. That means that the largest CU may be split into smaller CUs of different sizes. The embodiments can also be used in connection with such coding units, which are regarded as being encompassed by the expression "block of pixels" as used herein.

Each pixel in the block has a respective pixel value. Video frames generally have color values assigned to the pixels, where the color values are represented in a defined color formats. One of the common color formats uses one luminance component and two chrominance components for each pixel, although other formats exist, such as using red, green and blue components for each pixel.

Traditionally, luminance component filtering and chrominance component filtering are done separately possibly employing different filtering decisions and different deblocking filters. It is, though, possible that the luminance filtering decisions are used in chroma filtering, like in HEVC. The embodiments can be applied to filter the luminance component, filter the chrominance component or filter both the luminance component and the chrominance component. In a particular embodiment, the embodiments are applied to achieve luminance or luma filtering. Filtering decisions, or parts of filtering decisions for one component, such as luma, can be then used when making the filtering decisions for other components, such as chroma.

Deblocking filtering is conducted over a boundary, edge or border between neighboring blocks. As a consequence, such boundaries can be vertical boundaries 1, see FIG. 2A, between two neighboring blocks 10, 20 present side by side in the video frame. Alternatively, the boundaries are horizontal boundaries 1, see FIG. 2B, between two neighboring block 10, 20, where one block 10 is positioned above the other block 20 in the video frame. In a particular embodiment, vertical boundaries are filtered first starting from the left-most boundary and proceeding through the boundaries towards the right-hand side in their geometrical order. Then, horizontal boundaries are filtered starting with the boundary on the top and proceeding through the boundaries towards the bottom in their geometrical order. The embodiments are, however, not limited to this particular filtering order and can actually be applied to any predefined filtering order. In a particular embodiment, the boundaries at the edge of the video frame are preferably not filtered and thereby excluded from the deblocking filtering.

The method of this embodiment starts in step S1 where a first offset or delta is calculated for a line 12 of pixels 11, 13, 15, 17 in the block 10. According to the embodiments, this first offset is calculated based on $(9\times(q0-p0)-3\times(q1-p1))/16$, wherein p0 denotes the pixel value of the pixel 11 closest to the block boundary 1 in the line 12 of pixels 11, 13, 15, 17 in the block 10, p1 denotes the pixel value of the pixel 13 next closest to the block boundary 1 in the line 12 of pixels 11, 13, 15, 17, q0 denotes the pixel value of the pixel 21 closest to the block boundary 1 in a corresponding or opposing line 22 of pixels 21, 23, 25, 27 in a neighboring block 20 and q1 denotes the pixel value of the pixel 23 next closest to the block boundary 1 in the corresponding line 22 of pixels 21, 23, 25, 27.

The line 12 of pixels 11, 13, 15, 17 in the block 10 and the corresponding line 22 of pixels 21, 23, 25, 27 in the neighboring block 20 belong to the same horizontal line of pixels, i.e. row of pixels, extending over a vertical boundary 1, see FIG. 2A, or belong to the same vertical line of pixels, i.e. column of pixels, extending over a horizontal boundary 1, see FIG. 2B. Hence, the line 12 of pixels 11, 13, 15, 17 and the corresponding line 22 of pixels 21, 23, 25, 27 are perpendicular to the block boundary 1 between the block 10 and the neighboring block 20. Furthermore, the line 12 of pixels 11, 13, 15, 17 in the block 10 and the corresponding line 22 of pixels 21, 23, 25, 27 in the neighboring block 20 have the same line number. For instance, if the block 10 and the neighboring block 20 each comprises N, such as eight, rows or columns of pixels, having row or column numbers i=0 ... N−1 then the line 10 of pixels 11, 13, 15, 17 has line number i in the block 10 and the corresponding line 20 of pixels 21, 23, 25, 27 also has line number i but in the neighboring block 20. Thus, line 12 of pixels 11, 13, 15, 17 in the block and the corresponding line 22 of pixels 21, 23, 25, 27 in the neighboring block 20 are opposing lines with regard to the block boundary 1.

According to the embodiments, "line of pixels" and "corresponding line of pixels" are employed to denote a "row of pixels" and a "corresponding row of pixels" in the case of a vertical block boundary as in FIG. 2A and denote a "column of pixels" and a "corresponding column of pixels" in the case of a horizontal block boundary as in FIG. 2B.

A next step S2 modifies the pixel value of the pixel 11 closest to the block boundary 1 in the line 12 of pixels 11, 13, 15, 17 by adding the first offset calculated in step S1 to the pixel value of this pixel 11 to form a modified pixel value p0'. Thus, the modified pixel value p0' for this pixel 11 is p0'=p0+Δ, wherein Δ denotes the first offset from step S1. Correspondingly, the pixel value of the pixel 21 closest to the block boundary 1 but in the corresponding line 22 of pixels 21, 23, 25, 27 in the neighboring block 20 is modified in step S3 by subtracting the first offset from the pixel value of this pixel 21 to form a modified pixel value q0'. The modified pixel value q0' is therefore calculated as q0'=q0−Δ.

The modification of the pixel value for the pixel 11 closest to the block boundary 1 in the line 12 of pixels 11, 13, 15, 17 in the block 10 in step S2 and the modification of the pixel value for the pixel 21 closest to the block boundary 1 in the corresponding line 22 of pixels 21, 23, 25, 27 in the neighboring block 20 in step S3 can be performed serially as illustrated in FIG. 1 or serially but in the opposite order, i.e. step S3 prior to step S2. Alternatively, the two steps S2 and S3 can be performed at least partly in parallel.

The method illustrated in FIG. 1 and including steps S1 to S3 reduces blocking artifacts at the block boundary 1 by processing pixels in one line 11 of pixels 11, 13, 15, 17 in the block and also in the corresponding line 22 of pixels 21, 23, 25, 27 in the neighboring block 20. This pixel modification can be performed for one of the (horizontal or vertical) lines 12 in the block 10 or for multiple, i.e. at least two, lines 12 in the block 10, possibly for all (horizontal or vertical) lines 12 in the block 10. This is schematically illustrated by the line L1.

Generally, and which was discussed in the foregoing, deblocking filtering involves filter decisions that determine whether a deblocking filter is to be applied over a horizontal or vertical block boundary for a block. If such a decision is positive the deblocking filter is then possibly applied to all columns (vertical lines) or rows (horizontal lines) of the block. Alternatively, further filtering decisions are taken for each column or row to decide whether deblocking filter is to be applied or not and/or what type of deblocking filter to use for that particular column or row. Therefore, the method as illustrated in FIG. 1 could be applied to a column, to a row, to multiple columns, to multiple rows or both for at least one column and at least one row in a block of pixels in the video frame. It is further anticipated that deblocking filtering does not necessarily have to be applied to all blocks in the video frame. In clear contrast, such deblocking filtering is preferably only applied to the blocks and over block boundaries where there are blocking artifacts as determined by one or more filter decisions.

The deblocking filtering will now be further described herein in connection with various implementation embodiments.

Clipping of the first offset can be performed in an embodiment to thereby restrict the value of the first offset to be within an interval of $-t_C$ and $t_C$. The threshold value $t_C$ is preferably dependent on a quantization parameter (QP) value assigned to the block. In such a case, a table of different threshold values for different QP values could be used. Table 1 listed below is an example of such a table.

TABLE 1

$t_C$ values for different QP values

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| $t_C$ | 0 | 0 | 0 | 0 | 0 | 0 | 0 | 0 | 0 | 0 | 0 | 0 | 0 | 0 | 0 | 0 | 0 | 0 | 1 |
| QP | 19 | 20 | 21 | 22 | 23 | 24 | 25 | 26 | 27 | 28 | 29 | 30 | 31 | 32 | 33 | 34 | 35 | 36 | 37 |
| $t_C$ | 1 | 1 | 1 | 1 | 1 | 1 | 1 | 1 | 2 | 2 | 2 | 2 | 3 | 3 | 3 | 3 | 4 | 4 | 4 |
| QP | 38 | 39 | 40 | 41 | 42 | 43 | 44 | 45 | 46 | 47 | 48 | 49 | 50 | 51 | 52 | 53 | 54 | 55 | |
| $t_C$ | 5 | 5 | 6 | 6 | 7 | 8 | 9 | 9 | 10 | 10 | 11 | 11 | 12 | 12 | 13 | 13 | 14 | 14 | |

The present embodiments are, however, not limited to the particular relationship between $t_C$ and QP as shown in Table 1 but could instead determine the $t_C$ value for the block based on the QP value for the block in some other way.

FIG. 3 illustrates this clipping action. The method then continues from step S1 of FIG. 1. A next step S10 investigates whether the first offset is within the interval $-t_C$ and $t_C$, i.e. whether $-t_C \leq \Delta \leq t_C$. In such a case, the method continues to step S2 of FIG. 1 and no modification of the first offset is required. However, if the first offset is not within the interval as determined in step S10 the method continues to step S11 where the first offset is clipped to have a value within the interval. Thus, if $\Delta < -t_C$ the first offset is set to have a value of $-t_C$ in step S11. Correspondingly, if $\Delta > t_C$ then the first offset is set to have a value of $t_C$ in step S11. The method then continues to step S2 of FIG. 2.

Correspondingly, the modified pixel values calculated in steps S2 and S3 of FIG. 1 could be clipped to be within an allowed interval. This is schematically illustrated by the flow diagram of FIG. 4. The method then continues from step S2 or S3 in FIG. 1 and a next step S20 investigates whether the modified pixel value, i.e. p0' or q0', is within an allowed interval of 0 and M. The parameter M denotes a defined maximum value that the modified pixel values can assume. In a particular embodiment, this maximum value is defined based on the number of bits that are spent on the pixel values. Thus, assume that the pixel values are in the form of a m-bit value, then M is preferably equal to $2^m-1$. For instance, if each pixel value is a 8-bit value, i.e. m=8, then M=255. Step S20 therefore investigates whether $0 \leq p0' \leq M$ or $0 \leq q0' \leq M$. If the modified pixel value is within the interval [0, M] the method continues to step S3 of FIG. 1 or ends. However, if the modified pixel value is outside of the interval it is clipped in step S21 to have a value inside the interval. In other words, if p0'<0 or q0'<0 then the modified pixel value is set in step S21 to be p0'=0 or q0'=0. Correspondingly, if p0'>M or q0'>M then step S21 sets the modified pixel value to be p0'=M or q0'=M.

Step S1 of FIG. 1 calculates the first offset to be based on $(9 \times (q0-p0)-3 \times (q1-p1))/16$. In a particular embodiment, the first offset is calculated in step S1 to be equal to $(9 \times (q0-p0)-3 \times (q1-p1))/16$. In an embodiment, the pixel values are therefore updated by the proposed deblocking filter by using the following calculations:

$$\Delta = (9 \times (q0-p0)-3 \times (q1-p1))/16$$

$$p0' = p0 + \Delta$$

$$q0' = q0 - \Delta$$

Clipping of the first offset and/or the modified pixel values as illustrated in FIGS. 3 and 4 can also be used.

In an alternative embodiment, the offset is calculated as a function of $(9 \times (q0-p0)-3 \times (q1-p1))/16$. Such a function could then be defined so that the calculation of the first offset is efficiently performed in hardware. In such a case, it is generally preferred not to have any divisions and/or define the function so that the first offset will be an integer value. In an embodiment, (X+8)>>4 is used as an integer-expression of X/16, where >> denotes a right shift operation. Thus, in a particular embodiment step S1 calculates the first offset to be based on and preferably equal to $(9 \times (q0-p0)-3 \times (q1-p1)+8)>>4$.

In this embodiment, the pixel values are therefore updated by the proposed deblocking filter by using the following calculations:

$$\Delta = (9 \times (q0-p0)-3 \times (q1-p1)+8)>>4$$

$$p0' = p0 + \Delta$$

$$q0' = q0 - \Delta$$

or if clipping is used:

$$\Delta = Clip3(-t_C, t_C, (9 \times (q0-p0)-3 \times (q1-p1)+8)>>4)$$

$$p0' = Clip(p0+\Delta)$$

$$q0' = Clip(q0-\Delta)$$

wherein Clip3(A, B, x) is defined as Clip3(A, B, x)=A if x<A, Clip3(A, B, x)=B if x>B and Clip3(A, B, x)=x if $A \leq x \leq B$ and Clip(x) is defined as Clip(0, M, x).

In alternative embodiments other implementations, such as integer representations of $(9 \times (q0-p0)-3 \times (q1-p1))/16$ and preferably such integer representations that are efficiently implemented in hardware are used.

The above disclosed embodiments define a deblocking filter that generates a first offset for the pixels closest to the block boundary with a formula that produces approximately zero, preferably exactly zero, when applied to a ramp of pixel values and which produces an offset value that smoothes a step in the pixel values when applied to a step of pixel values. For instance, a ramp can be described as linearly increasing or decreasing pixel values, e.g. 10, 20, 30, 40. When calculating the first offset for these pixel values, i.e. p1=10, p0=20, q0=30, q1=40, the first offset will be zero. Correspondingly, a step can be described as a step increase or decrease in pixel values, e.g. 10, 10, 20, 20. When calculating the first offset for these pixel values, i.e. p1=10, p0=10, q0=20, q1=20, the first offset will be 3.75 if Δ=(9×(q0−p0)−3×(q1−p1))/16 or 4 if Δ=(9×(q0−p0)−3×(q1−p1)+8)>>4. The modified pixel values will then be 10, 13.75, 16.25, 30 or 10, 14, 16, 20 and thereby a smoothing of the step is achieved. The first offset is also zero for a flat line, i.e. if the pixel values are equal, p0=p1=q0=q1.

In a particular embodiment, also the pixel values of the pixels next closest to the block boundary can be modified. This is described further herein with reference to FIGS. 2A, 2B and 5. The method then continues from step S3 of FIG. 1 or from step S2 or indeed step S1. A next step S30 calculates a second offset to be based on (p2+p0−2×p1+2×Δ)/4, wherein p2 denotes the pixel value of the pixel 15 second next closest to the block boundary 1 in the line 12 of pixels 11, 13, 15, 17 in the block 10. A next step S31 calculates a third offset to be based on (q2+q0−2×q1−2×Δ)/4, wherein q2 denotes the pixel value of the pixel 25 second next closest to the block boundary 1 in the corresponding line 22 of pixels 21, 23, 25, 27 in the neighboring block 20. Steps S30 and S31 can be performed sequentially in any order or at least partly in parallel.

The second offset calculated in step S30 is used in step S32 to modify the pixel value of the pixel 13 next closest to the block boundary 1 in the line 12 of pixels 11, 13, 15, 17. In an embodiment, the second offset is added to the pixel value of this pixel 13 to obtain a modified pixel value. Correspondingly, step S33 modifies the pixel value of the pixel 23 next closest to the block boundary 1 in the corresponding line 22 of pixels 21, 23, 25, 27 by adding the third offset to the pixel value of this pixel 23 to form a modified pixel value. Steps S32 and S33 can be performed in any sequential order or at least partly in parallel.

The proposed deblocking filter is, in this embodiment, a low-pass filter on all the filter positions p0, p1, q0, q1. When applied to a ramp signal, the deblocking filter will not modify it since Δ, $\Delta_p$, $\Delta_q$ will all be equal to zero, wherein $\Delta_p$ denotes the second offset and $\Delta_q$ denotes the third offset. When applied to a step signal, i.e. a deblocking artifact, the deblocking filter will smooth it, i.e. reduce the blocking artifact. In clear contrast to the current HEVC filter, the proposed deblocking filter will smooth and thereby attenuate small ripples on the sides of the block boundary.

In the above described embodiment, the filters for the coefficients that stand at the second position from the block boundary (p1, q1) are produced by using a combination of the first offset and a symmetrical low-pass filter. An advantage of this embodiment is that the offsets for the pixels second next closest to the block boundary can have different values that allows for a better local adaptation. In similar to the first offset, the second and third offsets can be clipped to be within an interval of $-t_{C2}$ and $t_{C2}$, where the threshold value $t_{C2}$ is determined based on the QP value assigned to the block. In a particular embodiment the threshold value $t_{C2}$ is determined based on the threshold value $t_C$ used for clipping the first offset in FIG. 3. For instance, $$t_{C2} = \frac{t_C}{2}$$

or with a hardware adapted implementation $t_{C2}=t_C>>1$.

FIG. 6 is a flow diagram illustrating such a clipping of the second and the third offsets. The method continues from step S30 or S31 of FIG. 5. A next step S40 investigates whether the second or third offset is within the interval of $-t_{C2}$ and $t_{C2}$. If this is true the method continues to step S32 or S33 of FIG. 5. However, if the second or third offset is smaller than $-t_{C2}$ or larger than $t_{C2}$ the method continues to step S41. This step S41 clips the second or third offset to be $-t_{C2}$ if $\Delta_{p,q}<-t_{C2}$ or sets the second or third offset to $t_{C2}$ if $\Delta_{p,q}>t_{C2}$.

The modified pixel values of the pixels next closest to the block boundary are preferably clipped to be within the interval of 0 and M in similarity to the modified pixel values for the pixels closest to the block boundary. Hence, the method steps of FIG. 4 can be applied also to these pixels to force the pixel values to be within [0, M].

In an embodiment, the modified pixel values of the pixels 13, 23 next closest to the block boundary 1 are calculated as:

$$\Delta_p=(p2+p0-2\times p1+2\times\Delta)/4$$

$$p1'=p1+\Delta_p$$

$$\Delta_q=(q2+q0-2\times q1-2\times\Delta)/4$$

$$q1'=q1+\Delta_q$$

Optionally clipping of the second and third offsets and/or the modified pixel values as disclosed above are used.

In alternative embodiment, the computations of the offsets could be performed to be independent of each other.

$$\Delta=(9\times(q0-p0)-3\times(q1-p1)+8)>>4$$

$$p0'=p0+\Delta$$

$$q0'=q0-\Delta$$

$$\Delta_p=(p0+p2-2\times p1)/4$$

$$p1'=p1+\Delta_p+\Delta/2$$

$$\Delta_q=(q0+q2-2\times q1)/4$$

$$q1'=q1+\Delta_q-\Delta/2$$

Mathematically this is equivalent as the previously disclosed embodiment. Optional clipping can also be performed for this embodiment.

In an alternative embodiment, the second and third offsets are calculated based on, such as a function, of (p2+p0−2×p1+2×Δ)/4 and (q2+q0−2×q1−2×Δ)/4, respectively. For instance, such function could be adapted for a hardware implementation and/or be an integer representation of (p2+p0−2×p1+2×Δ)/4 and (q2+q0−2×q1−2×Δ)/4. A particular example of such a hardware implementation that produces integer values is to calculate the second offset to be based on, preferably equal to, (((p2+p0+1)>>1)−p1+Δ)>>1. Correspondingly, the third offset is preferably calculated to be based on, preferably equal to, (((q2+q0+1)>>1)−q1−Δ)>>1.

In such a case, the modified pixel values are calculated as:

$$\Delta_p=(((p2+p0+1)>>1)-p1+\Delta)>>1$$

$$p1'=p1+\Delta_p$$

$$\Delta_q=(((q2+q0+1)>>1)-q1-\Delta)-1$$

$$q1'=q1+\Delta_q$$

or if clipping is used:

$$\Delta_p = \text{Clip3}(-t_{C2}, t_{C2}, (((p2+p0+1)\!>\!>\!1) - p1 + \Delta)\!>\!>\!1)$$

$$p1' = \text{Clip}(p1 + \Delta_p)$$

$$\Delta_q = \text{Clip3}(-t_{C2}, t_{C2}, (((q2+q0+1)\!>\!>\!1) - q1 - \Delta)\!>\!>\!1)$$

$$q1' = \text{Clip}(q1 + \Delta_q)$$

An alternative embodiment for calculating the second and third offsets, which is adapted for hardware-implementation, is:

$$\Delta_p = \text{Clip3}(-t_{C2}, t_{C2}, ((p2+p0-((p1-\Delta)-1)+2)\!>\!>\!2))$$

$$\Delta_q = \text{Clip3}(-t_{C2}, t_{C2}, ((q2+a0-((q1+\Delta)-1)+2)\!>\!>\!2))$$

wherein >> denotes a left shift operation.

A further alternative embodiment for calculating the second and third offsets, which is adapted for hardware-implementation, is:

$$\Delta_p = \text{Clip3}(-t_{C2}, t_{C2}, ((((p2+p0+1)\!>\!>\!1) - p1 + \Delta + 1)\!>\!>\!1))$$

$$\Delta_q = \text{Clip3}(-t_{C2}, t_{C2}, ((((q2+q0+1)\!>\!>\!1) - q1 - \Delta + 1)\!>\!>\!1))$$

In another embodiment, one can use a stronger low-pass filter in combination with the first offset. In this case the second offset is calculated based on, such as equal to, (p2+p0−2×p1+Δ)/2 or, in a hardware-adapted implementation, based on, preferably equal to, ((p2+p0+1+Δ)>>1)−p1 or alternatively ((p2+p0+Δ−(p1−1)+1)>>1). The third offset could then be calculated based on, such as equal to, (q2+q0−2×q1−Δ)/2 or, in a hardware-adapted implementation, based on, preferably equal to, ((q2+q0+1−Δ)>>1)−q1 or alternatively ((q2+q0−Δ−(q1−1)+1)>>1).

A particular embodiment calculates the first, second and third offsets for a line of pixels in the block to thereby modify the pixel values of both the pixels closest to the block boundary and the pixels next closest to the block boundary.

In an alternative embodiment, a decision is first made whether to calculate the second and third offsets and thereby whether to modify the pixel values of the pixels next closest to the block boundary in addition to modifying the pixel values of the pixels closest to the block boundary.

In similarity to the embodiments disclosed in the foregoing calculating second and third offsets in order to modify the pixel values of the pixels next closest to the block boundary, fourth and fifth offsets can be calculated in order to modify the pixel values of the pixels second next closest to the block boundary.

Figure 7:
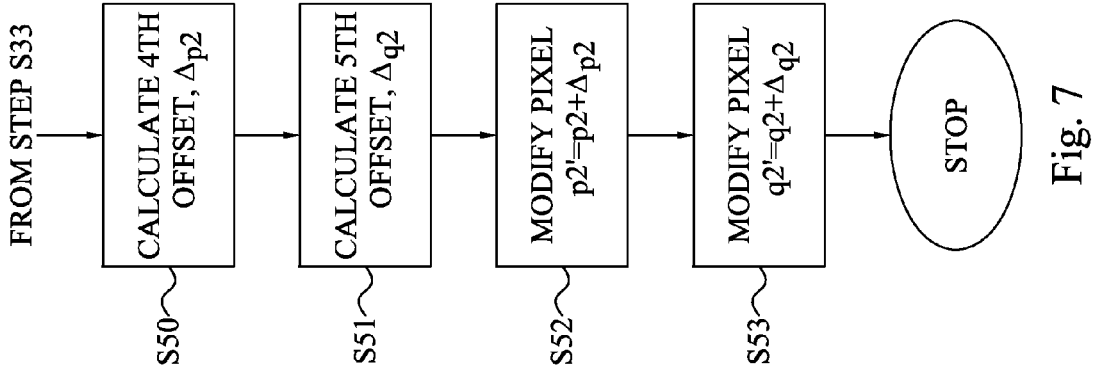
FIG. 7 is a flow diagram illustrating additional, optional steps of the method in FIG. 5 according to another embodiment.

FIG. 7 is a flow diagram illustrating such an embodiment. The method continues from step S33 of FIG. 5. A next step S50 calculates a fourth offset based on (p3+p1−2×p2+2×$\Delta_{p1}$)/4, wherein p3 denotes the pixel value of the pixel 17 third next closest to the block boundary 1 in the line 12 of pixels 11, 13, 15, 17 in the block 10 and $\Delta_{p1}$ denotes the second offset. Step S51 correspondingly calculates a fifth offset to be based on (q3+q1−2×q2+2×$\Delta_{q1}$)/4, wherein q3 denotes the pixel value of the pixel 27 third closest to the block boundary 1 in the corresponding line 22 of pixels 21, 23, 25, 27 in the neighboring block 20 and $\Delta_{q1}$ denotes the third offset. Steps S50 and S51 can be performed sequentially in any order or at least partly in parallel.

The fourth and fifth offsets can, in an alternative embodiment, be calculated to be based on (p3+p1−2×p2+$\Delta_{p1}$)/2 and (q3+q1−2×q2+$\Delta_{q1}$)/2 respectively, or alternatively (p3+p1−2×p2+2×$\Delta_{q1}$)/4 and (q3+q1−2×q2+2×$\Delta_{p2}$)/4.

The next two steps modify pixel values based on the fourth and fifth offset. Thus, step S52 modifies the pixel value of the pixel 15 second next closest to the block boundary 1 in the line 12 of pixel 11, 13, 15, 17 in the block 10 by adding the fourth offset to the pixel value of this pixel 15 to form a modified pixel value. Step S53 correspondingly modifies the pixel value of the pixel 25 second next closest to the block boundary 1 in the corresponding line 22 of pixels 21, 23, 25, 27 in the neighboring block 20 by adding the fifth offset to the pixel value of this pixel 25 to form a modified pixel value. Steps S52 and S53 can be performed sequentially in any order or at least partly in parallel.

This concept can also be generalized for the filters modifying more than three pixels from the block boundary. For example, the fourth pixel 17, 27 from the block boundary 1 can be obtained using a combination of the offsets for the third pixels 15, 25 (or the offset from the second pixels 13, 23 or the offset from the first pixels 11, 21) and a symmetrical low-pass filter. Even longer filters are also possible.

In similarity to the previous embodiments, the fourth and fifth offsets can also be clipped. In such a case, the same interval as for the second and third offsets or half that interval could be used. In an alternative embodiment, the clipping interval is −$t_{C3}$ to $t_{C3}$, wherein the threshold value $t_{C3}$ is determined based on the QP value associated with the block. Also the modified pixel values of the pixels second next closest to the block boundary can be clipped to be within the interval of 0 and M as disclosed in FIG. 4.

In a particular embodiment the modification of these pixel values are performed according to below:

$$\Delta_{p2} = (p3+p1-2\times p2+2\times \Delta_{p1})/4$$

$$p2' = p2 + \Delta_{p2}$$

$$\Delta_{q2} = (q3+q1-2\times q2+2\times \Delta_{q1})/4$$

$$q2' = q2 + \Delta_{q2}$$

wherein $\Delta_{p2}, \Delta_{q2}$ denote the fourth and fifth offsets, respectively. Optionally clipping can be performed as described in the foregoing.

A representation of (p3+p1−2×p2+2×$\Delta_{p1}$)/4 and (q3+q1−2×q2+2×$\Delta_{q1}$)/4 suitable for hardware implementation can be used in order to get the fourth and fifth offsets as integer values. In a particular embodiment, the fourth offset is calculated to be based on, preferably equal to, (((p3+p1+1)>>1)−p2+$\Delta_{p1}$)>>1. Correspondingly, (((q3+q1+1)>>1)−q2+$\Delta_{q1}$)>>1 is an integer representation for the fifth offset.

The present embodiments are adapted for combating blocking artifacts in connection with coding and decoding of video frames. The embodiments can therefore be applied to such video coding and decoding standards which divide video frames into blocks of pixels and thereby run a risk of having blocking artifacts over block boundaries. Examples of such standards, to which the present embodiments can be applied, are H.264 and HEVC. In particular HEVC, has the possibility to select between a weak filtering mode and a strong filtering mode. The present embodiments can then advantageously be used in the weak filtering mode in order to calculate offsets that are employed to modify the pixel values in a line of pixels and a corresponding line of pixels over a block boundary. Hence, the decisions whether to perform such deblocking filtering according to the prior art HEVC can advantageously be used for the present embodiments.

A particular aspect relates to a method of reducing blocking artifacts at a block boundary between a block of multiple pixels and a neighboring block of multiple pixels in a video frame. With reference to FIG. 1, the method comprises calculating, in step S1, a first offset based on a pixel value of a pixel closes to the block boundary in a line of pixels in the block, a pixel value of a pixel next closest to the block boundary in the line of pixels, a pixel value of a pixel closest to the block boundary in a corresponding or opposing line of pixels in the neighboring block and a pixel value of a pixel next closest to the block boundary in the corresponding line of pixels. The line of pixels and the neighboring line of pixels are perpendicular to the block boundary. The first offset is calculated based on these pixel values and a formula that produces an offset value that approximates zero, preferably equals zero, when the pixel values are linearly increasing or decreasing or are the same when traveling along the line of pixels and the corresponding line of pixels and produces an offset value that smoothes a step in the pixel values when the pixel values increase or decrease in a step when traveling along the line of pixels and the corresponding line of pixels. The method also comprises modifying, in step S2, the pixel value of the pixel closest to the block boundary in the line of pixels by adding the first offset to the pixel value of the pixel closest to the block boundary in the line of pixels. A next step S3 modifies the pixel value of the pixel closest to the block boundary in the corresponding line of pixels by subtracting the first offset from the pixel value of the pixel closest to the block boundary in the corresponding line of pixels.

This particular aspect can be combined with the embodiments discussed in the foregoing in connection with FIGS. 1-7.

Figure 8:
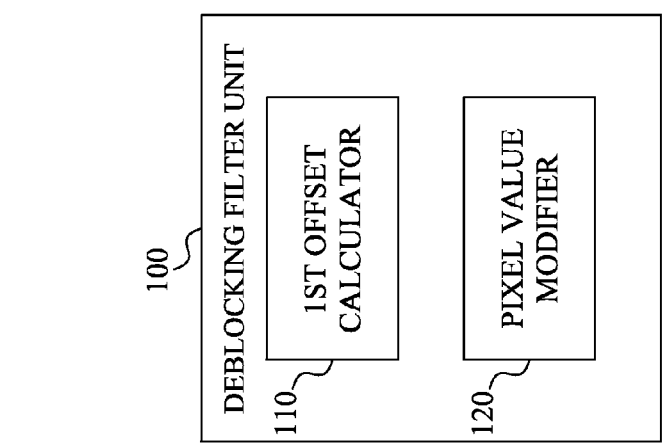
FIG. 8 is a schematic block diagram of a deblocking filter unit according to an embodiment.

The method of reducing blocking artifacts according to the embodiment disclosed in FIG. 1 is preferably performed by a deblocking filter unit. Hence, such a deblocking filter unit then calculates the first offset in step S1 and modifies the pixel values of the pixels closest to the block boundary in steps S2 and S3. FIG. 8 is a schematic block diagram of an embodiment of such a deblocking filter unit 100.

The deblocking filter unit 100 comprises a first offset calculator 110 configured to calculate a first offset based on $(9\times(q0-p0)-3\times(q1-p1))/16$ as previously disclosed herein for a line of pixels in a block of pixels in a video frame. A pixel modifier 120 of the deblocking filter unit 100 is configured to modify the pixel value of a pixel closest to a block boundary in the line of pixels in the block by adding the first offset calculated by the first offset calculator 110 to the pixel value of this pixel to form a modified pixel value. The pixel modifier 120 further modifies the pixel value of a pixel closest to the block boundary but in a corresponding line of pixels in a neighboring block of pixels in the video frame. This modification by the pixel value modifier 120 is achieved by subtracting the first offset calculated by the first offset calculator 110 from the pixel value of this pixel to form a modified pixel value.

Hence, in a particular embodiment the pixel modifier 120 is configured to add the first offset to the pixel value of the pixel closest to the block boundary in the line of pixels to form a modified pixel value. The pixel modifier 120 is further configured to subtract the first offset from the pixel value of the pixel closest to the block boundary in the corresponding line of pixels to form a modified pixel value.

In a particular embodiment, the first offset calculator 110 is configured to calculate the first offset to be $f((9\times(q0-p0)-3\times(q1-p1))/16)$, i.e. a function $f()$ or representation of $(9\times(q0-p0)-3\times(q1-p1))/16$. This function preferably outputs an integer representation of $(9\times(q0-p0)-3\times(q1-p1))/16$ and preferably the function is suitable for hardware implementation. The first offset calculator 110 is configured, in an embodiment, to calculate the first offset to be based on, preferably equal to, $(9\times(q0-p0)-3\times(q1-p1)+8)>>4$.

FIG. 9 is a schematic block diagram of a deblocking filter unit 200 according to another embodiment. The deblocking filter unit 200 comprises the first offset calculator 210 and the pixel value modifier 220. These units 210, 220 operate as discussed in the foregoing in connection with FIG. 8. The deblocking filter unit 200 preferably also comprises a first clipping unit 230. This first clipping unit 230 is configured to clip the first offset to be within an interval of $-t_C$ and $t_C$. The threshold value $t_C$ is then dependent on a QP value associated with the block and can, for instance, be selected from Table 1 based on the QP value of the block.

An optional second clipping unit 240 is implemented in the deblocking filter unit 200 for clipping the modified pixel values calculated by the pixel value modifier 220. Thus, the second clipping unit 240 limits these modified pixel values to be within an interval of zero and the defined maximum value M.

In a preferred embodiment the deblocking filter unit 200 also comprises a second offset calculator 250 configured to calculate a second offset based on $(p2+p0-2\times p1+2\times\Delta)/4$ for the line of pixels in the block.

In a particular embodiment, the second offset calculator 250 is configured to calculate the second offset to be $g((p2+p0-2\times p1+2\times\Delta)/4)$, i.e. a function $g()$ or representation of $(p2+p0-2\times p1+2\times\Delta)/4$. This function preferably outputs an integer representation of $(p2+p0-2\times p1+2\times\Delta)/4$ and preferably the function is suitable for hardware implementation. The second offset calculator 250 is configured, in an embodiment, to calculate the second offset to be based on, preferably equal to, $(((p2+p0+1)>>1)-p1+\Delta)>>1$.

The deblocking filter unit 200 preferably comprises a third offset calculator 260 configured to calculate a third offset based on $(q2+q0-2\times q1-2\times\Delta)/4$ for the corresponding line of pixels in the neighboring block.

In a particular embodiment, the third offset calculator 260 is configured to calculate the third offset to be $h((q2+q0-2\times q1-2\times\Delta)/4)$, i.e. a function $h()$ or representation of $(q2+q0-2\times q1-2\times\Delta)/4$. This function preferably outputs an integer representation of $(q2+q0-2\times q1-2\times\Delta)/4$ and preferably function is suitable for hardware implementation. The third offset calculator 260 is configured, in an embodiment, to calculate the third offset to be based on, preferably equal to, $(((q2+q0+1)>>1)-q1-\Delta)-1$.

The pixel modifier 220 of the deblocking filter unit 200 is then furthermore configured to modify the pixel value of the pixel next closest to the block boundary in the line of pixels in the block. The pixel modifier 220 adds the second offset calculated by the second offset calculator 250 to the pixel value of this pixel. The pixel modifier 220 is additionally configured to modify the pixel value of the pixel next closest to the block boundary but in the corresponding line of pixels in the neighboring block. This modification is achieved by adding the third offset calculated by the third offset calculator 260 to the pixel value of this pixel.

An optional third clipping unit 270 of the deblocking filter unit 200 is configured to clip the second offset calculated by the second offset calculator 250 and the third offset calculated by the third offset calculator 260 to be within an interval of $-t_{C2}$ and $t_{C2}$. The threshold value $t_{C2}$ is preferably dependent on the QP value associated with the block and is advantageous calculated based on the threshold value $t_C$ used for clipping the first offset. In an alternative embodiment, the third clipping unit 270 is omitted and any clipping of the second and third offsets is instead performed by the first clipping unit 230.

The second clipping unit 240 preferably not only clips the modified pixel values of the pixels closest to the block boundary but also the modified pixel values of the pixels next closest to the block boundary and calculated using the second and third offsets, respectively. Thus, also these modified pixel values are preferably restricted to be within the interval of zero to the defined maximum value M.

The second offset calculator 250 and the third offset calculator 260 could be configured to calculate the second and third offsets for each line of pixels and each corresponding line of pixels for which deblocking filtering is to be applied over the block boundary between the block and the neighboring block. In an alternative approach the deblocking filter unit 200 performs a selection whether to only calculate the first offset and thereby only modify the pixel values of the pixels closest to the block boundary or to calculate both the first, second and third offsets and thereby modify the pixel values of the pixels closest to and the pixels next closest to the block boundary.

In an optional embodiment, the deblocking filter unit 200 can comprise a fourth offset calculator 280 configured to calculate a fourth offset to be based on $(p3+p1-2\times p2+2\times\Delta_{p1})/4$.

In a particular embodiment, the fourth offset calculator 280 is configured to calculate the fourth offset to be $b((p3+p1-2\times p2+2\times\Delta_{p1})/4)$, i.e. a function $b(\,)$ or representation of $(p3+p1-2\times p2+2\times\Delta_{p1})/4$. This function preferably outputs an integer representation of $(p3+p1-2\times p2+2\times\Delta_{p1})/4$ and preferably the function is suitable for hardware implementation. The fourth offset calculator 280 is configured, in an embodiment, to calculate the fourth offset to be based on, preferably equal to, $(((p3+p1+1)\gg 1)-p2+\Delta_{p1})\gg 1$.

The deblocking filter 200 could also comprise an optional fifth offset calculator 290 configured to calculate a fifth offset to be based on $(q3+q1-2\times q2+2\times\Delta_{q1})/4$.

In a particular embodiment, the fifth offset calculator 290 is configured to calculate the fifth offset to be $k((q3+q1-2\times q2+2\times\Delta_{q1})/4)$, i.e. a function $k(\,)$ or representation of $(q3+q1-2\times q2+2\times\Delta_{q1})/4$. This function preferably outputs an integer representation of $(q3+q1-2\times q2+2\times\Delta_{q1})/4$ and preferably the function is suitable for hardware implementation. The fifth offset calculator 290 is configured, in an embodiment, to calculate the fifth offset to be based on, preferably equal to, $(((q3+q1+1)\gg 1)-q2+\Delta_{q1})\gg 1$.

In this embodiment, the pixel value modifier 220 is also configured to modify the pixel value of the pixel second next closest to the block boundary in the line of pixels in the block by adding the fourth offset calculated by the fourth offset calculator 280 to the pixel value of this pixel. The pixel value modifier 220 additionally modifies, in this embodiment, the pixel value of the pixel second next closest to the block boundary in the corresponding line of pixels in the neighboring block by adding the fifth offset calculated by the fifth offset calculator to the pixel value of this pixel.

The second clipping unit 240 preferably processes the modified pixel values to restrict them within the interval of zero and the predefined maximum value M. The third clipping unit 270 can also be used to clip the fourth and fifth offsets in similarity to the second and third offsets. Alternatively, the deblocking filter unit 200 comprises a fourth clipping unit configured to clip the fourth and fifth offsets to be within an interval having end points that are defined based on the QP value of the block and preferably based on the threshold value $t_C$.

A particular aspect relates to a deblocking filter unit for reducing blocking artifacts at a block boundary between a block of multiple pixels and a neighboring block of multiple pixels in a video frame. With reference to FIG. 8, the deblocking filter unit 100 comprises a first offset calculator 110 configured to calculate a first offset based on a pixel value of a pixel closest to the block boundary in a line of pixels in the block, a pixel value of a pixel next closest to the block boundary in the line of pixels, a pixel value of a pixel closest to the block boundary in a corresponding or opposing line of pixels in the neighboring block and a pixel value of a pixel next closest to the block boundary in the corresponding line of pixels. The line of pixels and the neighboring line of pixels are perpendicular to the block boundary. The first offset is calculated by the first offset calculator 110 based on these pixel values and a formula that produces an offset value that approximates zero, preferably equals zero, when the pixel values are linearly increasing or decreasing or are the same when traveling along the line of pixels and the corresponding line of pixels and produces an offset value that smoothes a step in the pixel values when the pixel values increase or decrease in a step when traveling along the line of pixels and the corresponding line of pixels. The deblocking filter unit 100 also comprises a pixel value modifier 120 configured to modify the pixel value of the pixel closest to the block boundary in the line of pixels by adding the first offset to the pixel value of the pixel closest to the block boundary in the line of pixels to form a modified pixel value. The pixel value modifier 120 is further configured to modify the pixel value of the pixel closest to the block boundary in the corresponding line of pixels by subtracting the first offset from the pixel value of the pixel closest to the block boundary in the corresponding line of pixels to form a modified pixel value.

Although the respective unit 110, 120 and 210-290 disclosed in conjunction with FIGS. 8 and 9 have been disclosed as physically separate units 110, 120 and 210-290 in the device 100, 200, and all may be special purpose circuits, such as ASICs (Application Specific Integrated Circuits), alternative embodiments of the device 100, 200 are possible where some or all of the units 110, 120 and 210-290 are implemented as computer program modules running on a general purpose processor. Such an embodiment is disclosed in FIG. 10.

FIG. 10 schematically illustrates an embodiment of a computer 70 having a processing unit 72, such as a DSP (Digital Signal Processor) or CPU (Central Processing Unit). The processing unit 72 can be a single unit or a plurality of units for performing different steps of the method described herein. The computer 70 also comprises an input/output (I/O) unit 71 for receiving recorded or generated video frames or encoded video frames and encoded video frame or decoded video data. The I/O unit 71 has been illustrated as a single unit in FIG. 10 but can likewise be in the form of a separate input unit and a separate output unit.

Furthermore, the computer 70 comprises at least one computer program product 73 in the form of a non-volatile memory, for instance an EEPROM (Electrically Erasable Programmable Read-Only Memory), a flash memory or a disk drive. The computer program product 73 comprises a computer program 74, which comprises code means which when run on the computer 70, such as by the processing unit 72, causes the computer 70 to perform the steps of the method described in the foregoing in connection with FIG. 1. Hence, in an embodiment the code means in the computer program 74 comprises a first offset calculating module or first offset calculator 310 for calculating the first offset and a pixel value modifying module or a pixel value modifier 320 for modifying pixel values of a deblocking filter module 300 or deblocking filter device. These modules 310, 320 essentially perform the steps of the flow diagram in FIG. 1 when run on the processing unit 72. Thus, when the different modules 310, 320 are run on the processing unit 72 they correspond to the corresponding units 110, 120 of FIG. 8 and units 210, 220 of FIG. 9.

The computer program 74 may additionally comprise a first clipping module, a second clipping module, a second offset calculating module, a third offset calculating module and optionally also a third clipping module, a fourth offset calculating module and a fifth offset calculating module to perform the operation of the corresponding units 230-290 in FIG. 9.

The computer 70 of FIG. 10 can be a user equipment or be present in a user equipment 80. In such a case, the user equipment 80 may additionally comprise or be connected to a display 88 to display video data.

The deblocking filter unit 100, 200 of FIGS. 8 and 9 is preferably used in video coding. It functions and is therefore preferably implemented both in a video encoder and in a video decoder. The video decoder can be implemented preferably in hardware but also in software. The same holds for the video encoder.

Figure 11:
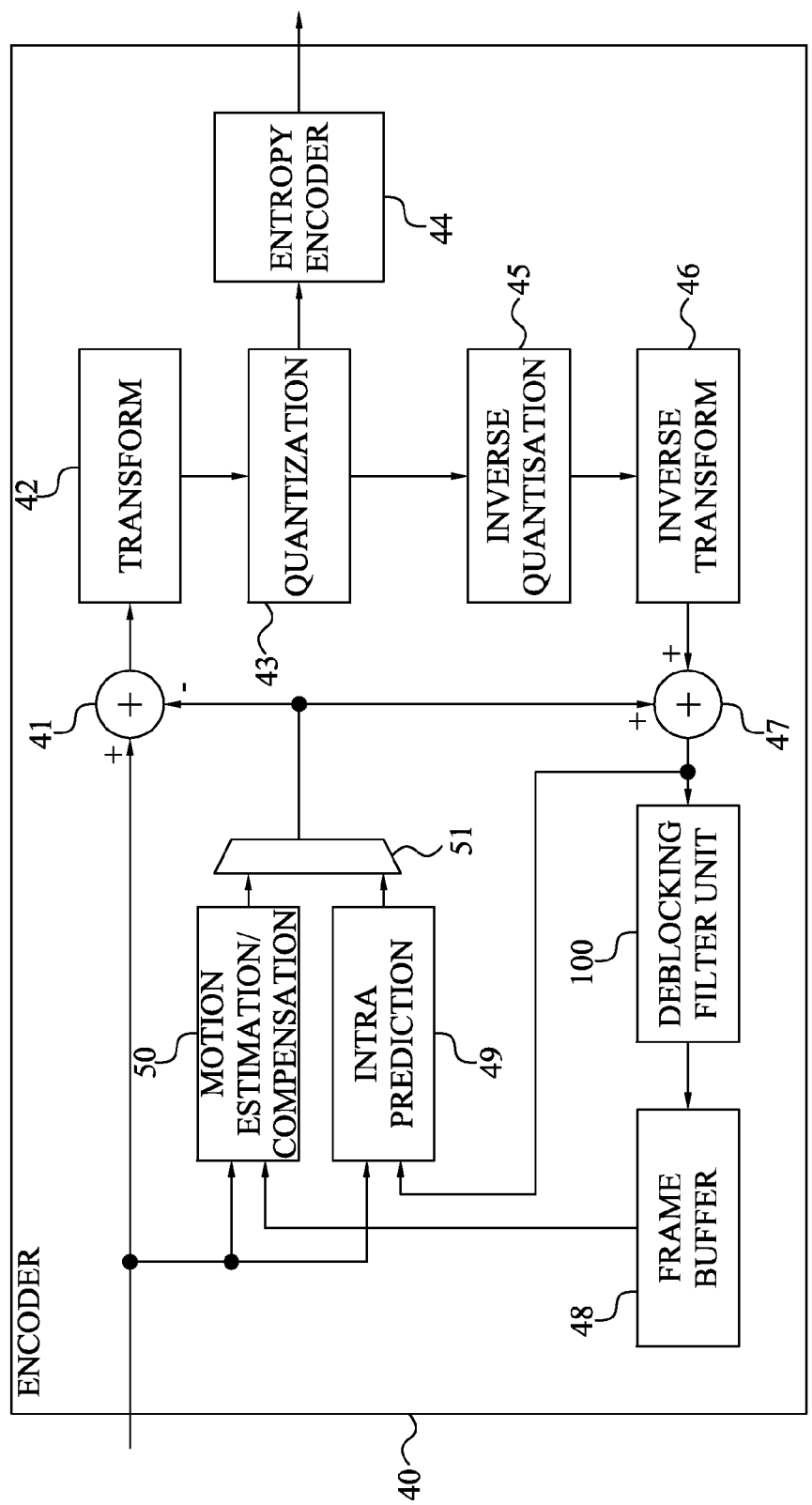
FIG. 11 is a schematic block diagram of an encoder according to an embodiment.

FIG. 11 is a schematic block diagram of an encoder 40 for encoding a block of pixels in a video frame of a video sequence according to an embodiment.

A current block of pixels is predicted by performing a motion estimation by a motion estimator 50 from an already provided block of pixels in the same frame or in a previous frame. The result of the motion estimation is a motion or displacement vector associated with the reference block, in the case of inter prediction. The motion vector is utilized by a motion compensator 50 for outputting an inter prediction of the block of pixels.

An intra predictor 49 computes an intra prediction of the current block of pixels. The outputs from the motion estimator/compensator 50 and the intra predictor 49 are input in a selector 51 that either selects intra prediction or inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction.

The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels.

The transformed and quantized residual error for the current block of pixels is also provided to a inverse quantizer 45 and inverse transformer 46 to retrieve the original residual error. This error is added by an adder 47 to the block prediction output from the motion compensator 50 or the intra predictor 49 to create a reference block of pixels that can be used in the prediction and coding of a next block of pixels. This new reference block is first processed by a deblocking filter unit 100 according to the embodiments in order to perform deblocking filtering to combat any blocking artifact. The processed new reference block is then temporarily stored in a frame buffer 48, where it is available to the intra predictor 49 and the motion estimator/compensator 50.

Figure 12:
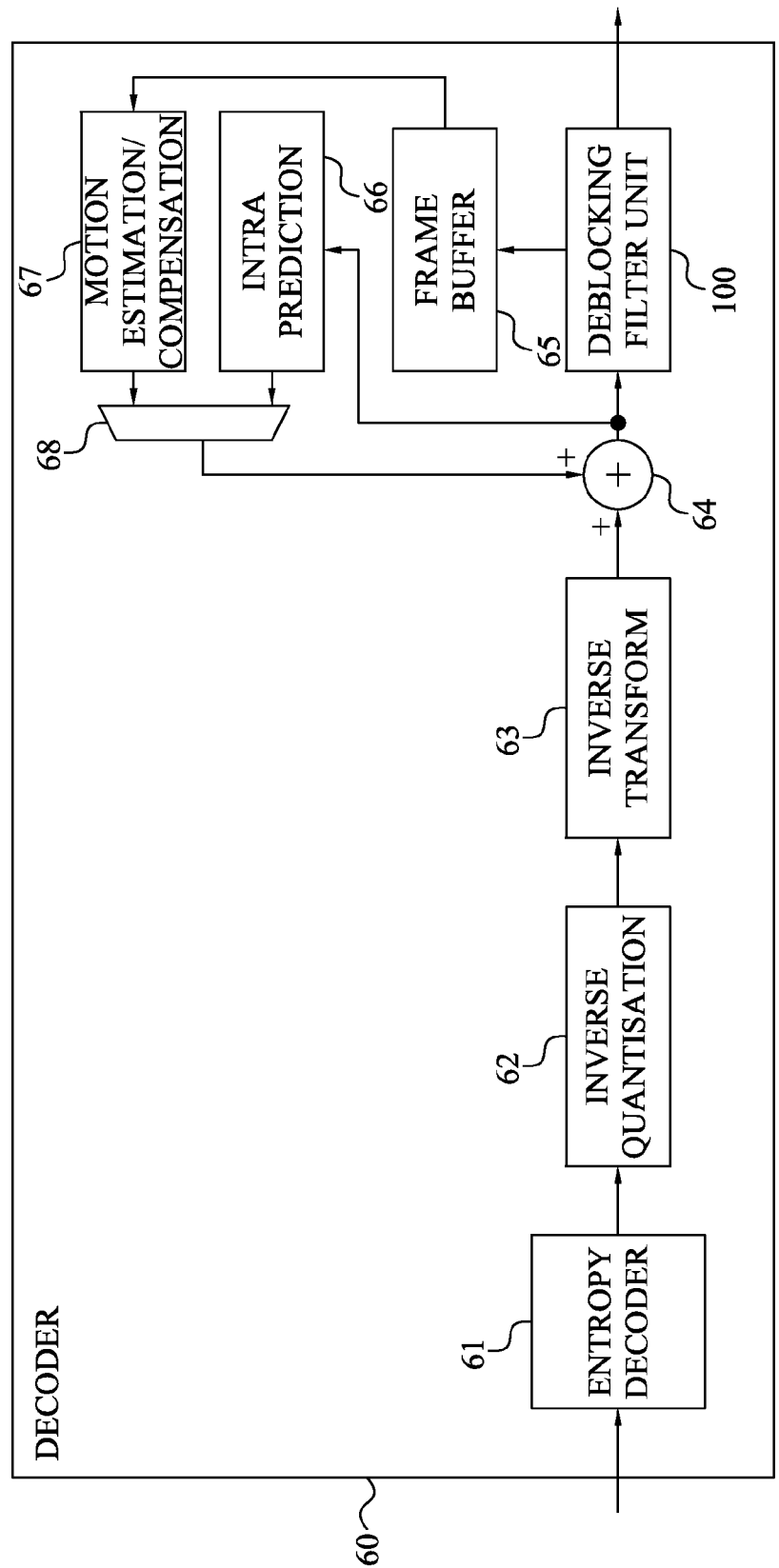
FIG. 12 is a schematic block diagram of a decoder according to an embodiment.

FIG. 12 is a corresponding schematic block diagram of a decoder 60 comprising a deblocking filter unit 100 according to the embodiments. The decoder 60 comprises a decoder 61, such as entropy decoder, for decoding an encoded representation of a block of pixels to get a set of quantized and transformed residual errors. These residual errors are dequantized in an inverse quantizer 62 and inverse transformed by an inverse transformer 63 to get a set of residual errors.

These residual errors are added in an adder 64 to the pixel values of a reference block of pixels. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block of pixels output form the adder 64 is input to a deblocking filter unit 100 according to the embodiments in order to deblocking filter any blocking artifacts. The filtered block of pixels is output form the decoder 60 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67.

The output from the adder 64 is preferably also input to the intra predictor 66 to be used as an unfiltered reference block of pixels.

In the embodiments disclosed in FIGS. 11 and 12 the deblocking filter unit 100 performs deblocking filtering as so called in-loop filtering. In an alternative implementation at the decoder 60 the deblocking filter unit 100 is arranged to perform so called post-processing filtering. In such a case, the deblocking filter unit 100 operates on the output frames outside of the loop formed by the adder 64, the frame buffer 65, the intra predictor 66, the motion estimator/compensator 67 and the selector 68. No deblocking filtering is then typically done at the encoder.

Figure 13:
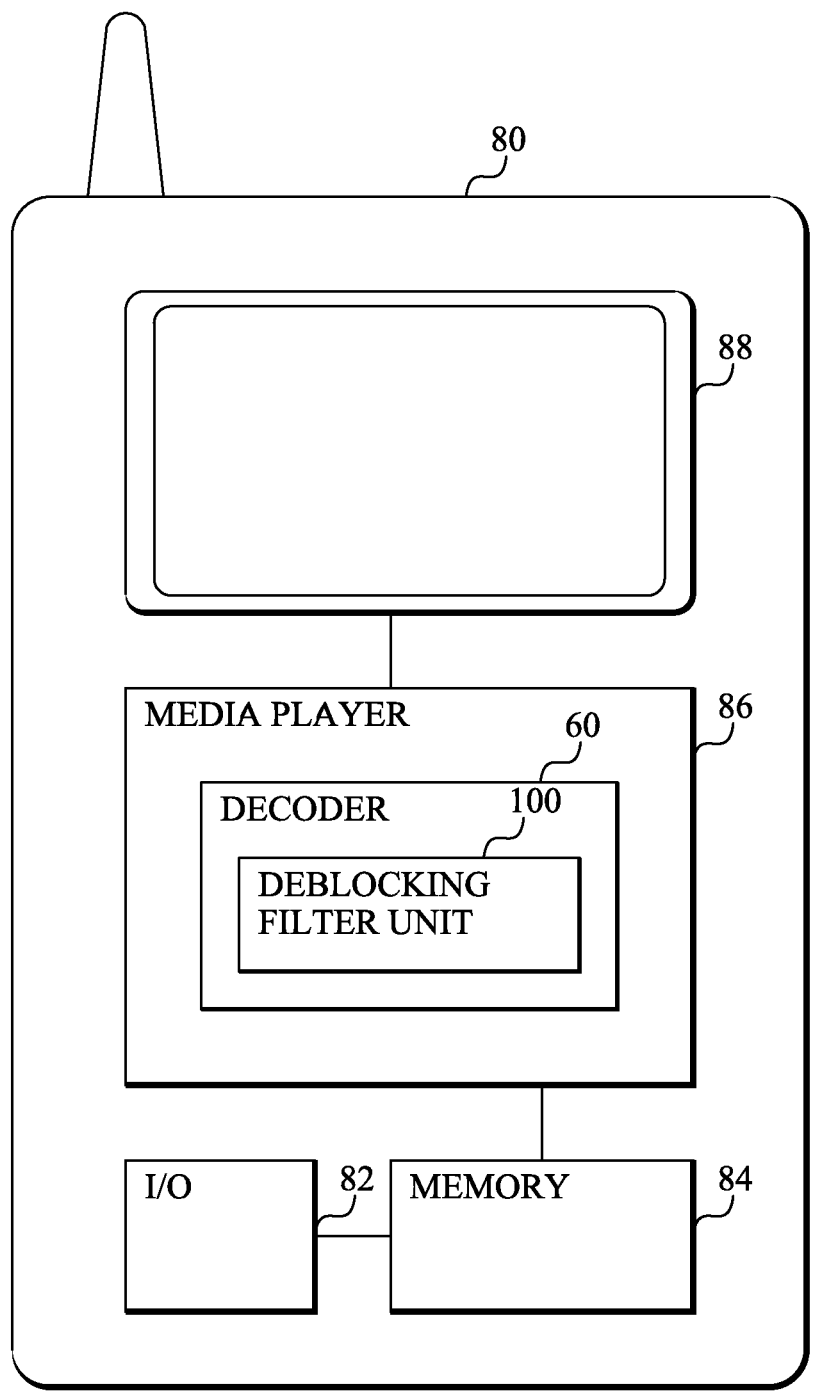
FIG. 13 is a schematic block diagram of a user equipment according to an embodiment.

FIG. 13 is a schematic block diagram of a user equipment or media terminal 80 housing a decoder 60 with a deblocking filter unit. The user equipment 80 can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes, TVs, computers, decoders, game consoles, etc. The user equipment 80 comprises a memory 84 configured to store encoded video frames. These encoded video frames can have been generated by the user equipment 80 itself. In such a case, the user equipment 80 preferably comprises a media engine or recorder together with a connected encoder, such as the encoder of FIG. 11. Alternatively, the encoded video frames are generated by some other device and wirelessly transmitted or transmitted by wire to the user equipment 80. The user equipment 80 then comprises a transceiver (transmitter and receiver) or input and output port 82 to achieve the data transfer.

The encoded video frames are brought from the memory 84 to a decoder 60, such as the decoder illustrated in FIG. 12. The decoder 60 comprises a deblocking filter unit 100 according to embodiments. The decoder 60 then decodes the encoded video frames into decoded video frames. The decoded video frames are provided to a media player 86 that is configured to render the decoded video frames into video data that is displayable on a display or screen 88 of or connected to the user equipment 80.

In FIG. 13, the user equipment 80 has been illustrated as comprising both the decoder 60 and the media player 86, with the decoder 60 implemented as a part of the media player 86. This should, however, merely be seen as an illustrative but non-limiting example of an implementation embodiment for the user equipment 80. Also distributed implementations are possible where the decoder 60 and the media player 86 are provided in two physically separated devices are possible and within the scope of user equipment 80 as used herein. The display 88 could also be provided as a separate device connected to the user equipment 80, where the actual data processing is taking place.

As illustrated in FIG. 14, the encoder 40 and/or decoder 60, such as illustrated in FIGS. 11 and 12, may be implemented in a network device 30 being or belonging to a network node in a communication network 32 between a sending unit 34 and a receiving user equipment 36. Such a network device 30 may be a device for converting video according to one video coding standard to another video coding standard, for example, if it has been established that the receiving user equipment 36 is only capable of or prefers another video coding standard than the one sent from the sending unit 34. The network device 30 can be in the form of or comprised in a radio base station, a Node-B or any other network node in a communication network 32, such as a radio-based network.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of reducing blocking artifacts at a block boundary between a block of multiple pixels and a neighboring block of multiple pixels in a video frame, said method comprises:

a deblocking filter unit calculating a first offset to be equal to $(9 \times (q0-p0) - 3 \times (q1-p1) + 8) >> 4$, wherein $>>$ denotes a right shift operation, p0 denotes a pixel value of a pixel closest to said block boundary in a line of pixels in said block, wherein said line of pixels is perpendicular to said block boundary, p1 denotes a pixel value of a pixel next closest to said block boundary in said line of pixels, q0 denotes a pixel value of a pixel closest to said block boundary in a corresponding line of pixels in said neighboring block, wherein said corresponding line of pixels is perpendicular to said block boundary and q1 denotes a pixel value of a pixel next closest to said block boundary in said corresponding line of pixels;

the deblocking filter unit modifying said pixel value p0 of said pixel closest to said block boundary in said line of pixels by adding said first offset to said pixel value p0 of said pixel closest to said block boundary in said line of pixels to form a modified pixel value p0' of said pixel closest to said block boundary in said line of pixels; and the deblocking filter unit modifying said pixel value q0 of said pixel closest to said block boundary in said corresponding line of pixels by subtracting said first offset from said pixel value q0 of said pixel closest to said block boundary in said corresponding line of pixels to form a modified pixel value q0' of said pixel closest to said block boundary in said corresponding line of pixels.

2. The method according to claim 1, further comprising clipping said first offset to be within an interval of $-t_C$ and $t_C$ by setting said first offset to be equal to $-t_C$ if said first offset is smaller than $-t_C$ and by setting said first offset to be equal to $t_C$ if said first offset is larger than $t_C$, wherein $t_C$ is a threshold value that is dependent on a quantization parameter value assigned to said block.

3. The method according to claim 1, further comprising:

clipping said modified pixel value p0' of said pixel closest to said block boundary in said line of pixels to be within an interval of zero and a defined maximum value by setting said modified pixel value p0' of said pixel closest to said block boundary in said line of pixels to be equal to zero if said modified pixel value p0' of said pixel closest to said block boundary in said line of pixels is smaller than zero and by setting said modified pixel value p0' of said pixel closest to said block boundary in said line of pixels to be equal to said defined maximum value if said modified pixel value p0' of said pixel closest to said block boundary in said line of pixels is larger than said defined maximum value; and clipping said modified pixel value q0' of said pixel closest to said block boundary in said corresponding line of pixels to be within an interval of zero and said defined maximum value by setting said modified pixel value q0' of said pixel closest to said block boundary in said corresponding line of pixels to be equal to zero if said modified pixel value q0' of said pixel closest to said block boundary in said corresponding line of pixels is smaller than zero and by setting said modified pixel value q0' of said pixel closest to said block boundary in said corresponding line of pixels to be equal to said defined maximum if said modified pixel value q0' of said pixel closest to said block boundary in said corresponding line of pixels is larger than said defined maximum value.

4. The method according to claim 1, further comprising:

calculating a second offset to be based on $(p2+p0-2 \times p1 + 2 \times \Delta)/4$, wherein p2 denotes a pixel value of a pixel second next closest to said block boundary in said line of pixels and $\Delta$ denotes said first offset;

calculating a third offset to be based on $(q2+q0-2 \times q1 - 2 \times \Delta)/4$, wherein q2 denotes a pixel value of a pixel second next closest to said block boundary in said corresponding line of pixels;

modifying said pixel value p1 of said pixel next closest to said block boundary in said line of pixels by adding said second offset to said pixel value p1 of said pixel next closest to said block boundary in said line of pixels to form a modified pixel value p1' of said pixel next closest to said block boundary in said line of pixels; and modifying said pixel value q1 of said pixel next closest to said block boundary in said corresponding line of pixels by adding said third offset to said pixel value q1 of said pixel next closest to said block boundary in said corresponding line of pixels to form a modified pixel value q1' of said pixel next closest to said block boundary in said corresponding line of pixels.

5. The method according to claim 4, wherein calculating said second offset comprises calculating said second offset to be equal to $(((p2+p0+1)>>1)-p1+\Delta)>>1$, wherein $>>$ denotes a right shift operation; and calculating said third offset comprises calculating said third offset to be equal to $(((q2+q0+1)>>1)-q1-\Delta)>>1$.

6. The method according to claim 4, further comprising:

clipping said second offset to be within an interval of $-t_{C2}$ and $t_{C2}$ by setting said second offset to be equal to $-t_{C2}$ if said second offset is smaller than $-t_{C2}$ and by setting said second offset to be equal to $t_{C2}$ if said second offset is larger than $t_{C2}$, wherein $t_{C2}$ is a threshold value that is dependent on a quantization parameter value assigned to said block; and clipping said third offset within an interval of $-t_{C2}$ and $t_{C2}$ by setting said third offset to be equal to $-t_{C2}$ if said third offset is smaller than $-t_{C2}$ and by setting said third offset to be equal to $t_{C2}$ if said third offset is larger than $t_{C2}$.

7. The method according to claim 4, further comprising:
clipping said modified pixel value p1' of said pixel next closest to said block boundary in said line of pixels to be within an interval of zero and a defined maximum value by setting said modified pixel value p1' of said pixel next closest to said block boundary in said line of pixels to be equal to zero if said modified pixel value p1' of said pixel next closest to said block boundary in said line of pixels is smaller than zero and by setting said modified pixel value p1' of said pixel next closest to said block boundary in said line of pixels to be equal to said defined maximum value if said modified pixel value p1' of said pixel next closest to said block boundary in said line of pixels is larger than said defined maximum value; and
clipping said modified pixel value q1' of said pixel next closest to said block boundary in said corresponding line of pixels to be within an interval of zero and said defined maximum value by setting said modified pixel value q1' of said pixel next closest to said block boundary in said corresponding line of pixels to be equal to zero if said modified pixel value q1' of said pixel next closest to said block boundary in said corresponding line of pixels is smaller than zero and by setting said modified pixel value q1' of said pixel next closest to said block boundary in said corresponding line of pixels to be equal to said defined maximum if said modified pixel value q1' of said pixel next closest to said block boundary in said corresponding line of pixels is larger than said defined maximum value.

8. The method according to claim 4, further comprising:
calculating a fourth offset to be based on $(p3+p1-2 \times p2+2 \times \Delta_{p1})/4$, wherein p3 denotes a pixel value of a pixel third next closest to said block boundary in said line of pixels and $\Delta_{p1}$ denotes said second offset; and
calculating a fifth offset to be based on $(q3+q1-2 \times q2+2 \times \Delta_{q1})/4$, wherein q3 denotes a pixel value of a pixel third closest to said block boundary in said corresponding line of pixels and $\Delta_{q1}$ denotes said third offset;
modifying said pixel value p2 of said pixel second next closest to said block boundary in said line of pixels by adding said fourth offset to said pixel value p2 of said pixel second next closest to said block boundary in said line of pixels to form a modified pixel value p2' of said pixel second next closest to said block boundary in said line of pixels; and
modifying said pixel value q2 of said pixel second next closest to said block boundary in said corresponding line of pixels by adding said fifth offset to said pixel value q2 of said pixel second next closest to said block boundary in said corresponding line of pixels to form a modified pixel value q2' of said pixel second next closest to said block boundary in said corresponding line of pixels.

9. The method according to claim 8, wherein
calculating said fourth offset comprises calculating said fourth offset to be equal to $(((p3+p1+1)>>1)-p2+\Delta_{p1})1$, wherein >> denotes a right shift operation; and
calculating said fifth offset comprises calculating said fifth offset to be equal to $(((q3+q1+1)>>1)-q2+\Delta_{q1})>>1$.

10. A deblocking filter unit for reducing blocking artifacts at a block boundary between a block of multiple pixels and a neighboring block of multiple pixels in a video frame, comprising:
a first offset calculator configured to calculate a first offset to be equal to $(9 \times (q0-p0)-3 \times )q1-p1)+8)>>4$, wherein >> denotes a right shift operation, p0 denotes a pixel value of a pixel closest to said block boundary in a line of pixels in said block, wherein said line of pixels is perpendicular to said block boundary, p1 denotes a pixel value of a pixel next closest to said block boundary in said line of pixels, q0 denotes a pixel value of a pixel closest to said block boundary in a corresponding line of pixels in said neighboring block, wherein said corresponding line of pixels is perpendicular to said block boundary, and q1 denotes a pixel value of a pixel next closest to said block boundary in said corresponding line of pixels; and
a pixel value modifier configured to modify said pixel value p0 of said pixel closest to said block boundary in said line of pixels by adding said first offset to said pixel value p0 of said pixel closest to said block boundary in said line of pixels to form a modified pixel value p0' of said pixel closest to said block boundary in said line of pixels and to modify said pixel value q0 of said pixel closest to said block boundary in said corresponding line of pixels by subtracting said first offset from said pixel value q0 of said pixel closest to said block boundary in said corresponding line of pixels to form a modified pixel value q0' of said pixel closest to said block boundary in said corresponding line of pixels.

11. The deblocking filter unit according to claim 10, further comprising a first clipping unit configured to clip said first offset within an interval of $-t_C$ and $t_C$ by setting said first offset to be equal to $-t_C$ if said first offset is smaller than $-t_C$ and by setting said first offset to be equal to $t_C$ if said first offset is larger than $t_C$, wherein $t_C$ is a threshold value that is dependent on a quantization parameter value assigned to said block.

12. The deblocking filter unit according to claim 10, further comprising a second clipping unit configured to clip said modified pixel value p0' of said pixel closest to said block boundary in said line of pixels to be within an interval of zero and a defined maximum value by setting said modified pixel value p0' of said pixel closest to said block boundary in said line of pixels to be equal to zero if said modified pixel value p0' of said pixel closest to said block boundary in said line of pixels is smaller than zero and by setting said modified pixel value p0' of said pixel closest to said block boundary in said line of pixels to be equal to said defined maximum value if said modified pixel value p0' of said pixel closest to said block boundary in said line of pixels is larger than said defined maximum value and to clip said modified pixel value q0' of said pixel closest to said block boundary in said corresponding line of pixels to be within an interval of zero and said defined maximum value by setting said modified pixel value q0' of said pixel closest to said block boundary in said corresponding line of pixels to be equal to zero if said modified pixel value q0' of said pixel closest to said block boundary in said corresponding line of pixels is smaller than zero and by setting said modified pixel value q0' of said pixel closest to said block boundary in said corresponding line of pixels to be equal to said defined maximum if said modified pixel value q0' of said pixel closest to said block boundary in said corresponding line of pixels is larger than said defined maximum value.

13. The deblocking filter unit according to claim 10, further comprising:
a second offset calculator configured to calculate a second offset to be based on $(p2+p0-2 \times p1+2 \times \Delta)/4$, wherein p2 denotes a pixel value of a pixel second next closest to said block boundary in said line of pixels and $\Delta$ denotes said first offset; and a third offset calculator configured to calculate a third offset to be based on $(q2+q0-2\times q1-2\times\Delta)/4$, wherein q2 denotes a pixel value of a pixel second next closest to said block boundary in said corresponding line of pixels, wherein said pixel value modifier is configured to modify said pixel value p2 of said pixel second next closest to said block boundary in said line of pixels by adding said fourth offset to said pixel value p2 of said pixel second next closest to said block boundary in said line of pixels to form a modified pixel value p2' of said pixel second next closest to said block boundary in said line of pixels and to modify said pixel value q2 of said pixel second next closest to said block boundary in said corresponding line of pixels by adding said fifth offset to said pixel value q2 of said pixel second next closest to said block boundary in said corresponding line of pixels to form a modified pixel value q2' of said pixel second next closest to said block boundary in said corresponding line of pixels.

14. The deblocking filter unit according to claim 13, wherein
said second offset calculator is configured to calculate said second offset to be equal to $(((p2+p0+1)>>1)-p1+\Delta)>>1$, wherein >> denotes a right shift operation; and
said third offset calculator is configured to calculate said third offset to be equal to $(((q2+q0+1)>>1)-q1-\Delta)>>1$.

15. The deblocking filter unit according to claim 13, further comprising a third clipping unit configured to clip said second offset to be within an interval of $-t_{C2}$ and $t_{C2}$ by setting said second offset to be equal to $-t_{C2}$ if said second offset is smaller than $-t_{C2}$ and by setting said second offset to be equal to $t_{C2}$ if said second offset is larger than $t_{C2}$, wherein $t_{C2}$ is a threshold value that is dependent on a quantization parameter value assigned to said block, and to clip said third offset within an interval of $-t_{C2}$ and $t_{C2}$ by setting said third offset to be equal to $-t_{C2}$ if said third offset is smaller than $-t_{C2}$ and by setting said third offset to be equal to $t_{C2}$ if said third offset is larger than $t_{C2}$.

16. The deblocking filter unit according to claim 13, further comprising a second clipping unit configured to clip said modified pixel value p1' of said pixel next closest to said block boundary in said line of pixels to be within an interval of zero and a defined maximum value by setting said modified pixel value p1' of said pixel next closest to said block boundary in said line of pixels to be equal to zero if said modified pixel value p1' of said pixel next closest to said block boundary in said line of pixels is smaller than zero and by setting said modified pixel value p1' of said pixel next closest to said block boundary in said line of pixels to be equal to said defined maximum value if said modified pixel value p1' of said pixel next closest to said block boundary in said line of pixels is larger than said defined maximum value, and to clip said modified pixel value q1' of said pixel next closest to said block boundary in said corresponding line of pixels to be within an interval of zero and said defined maximum value by setting said modified pixel value q1' of said pixel next closest to said block boundary in said corresponding line of pixels to be equal to zero if said modified pixel value q1' of said pixel next closest to said block boundary in said corresponding line of pixels is smaller than zero and by setting said modified pixel value q1' of said pixel next closest to said block boundary in said corresponding line of pixels to be equal to said defined maximum if said modified pixel value q1' of said pixel next closest to said block boundary in said corresponding line of pixels is larger than said defined maximum value.

17. The deblocking filter unit according to claim 13, further comprising:
a fourth offset calculator configured to calculate a fourth offset to be based on $(p3+p1-2\times p2+2\times\Delta_{p1})/4$, wherein p3 denotes a pixel value of a pixel third next closest to said block boundary in said line of pixels and $\Delta_{p1}$ denotes said second offset; and a fifth offset calculator configured to calculate a fifth offset to be based on $(q3+q1-2\times q2+2\times\Delta_{q1})/4$, wherein q3 denotes a pixel value of a pixel third closest to said block boundary in said corresponding line of pixels and $\Delta_{q1}$ denotes said third offset, wherein said pixel value modifier is configured to modify said pixel value p2 of said pixel second next closest to said block boundary in said line of pixels by adding said fourth offset to said pixel value p2 of said pixel second next closest to said block boundary in said line of pixels to form a modified pixel value p2' of said pixel second next closest to said block boundary in said line of pixels, and to modify said pixel value q2 of said pixel second next closest to said block boundary in said corresponding line of pixels by adding said fifth offset to said pixel value q2 of said pixel second next closest to said block boundary in said corresponding line of pixels to form a modified pixel value q2' of said pixel second next closest to said block boundary in said corresponding line of pixels.

18. The deblocking filter unit according to claim 17, wherein
said fourth offset calculator is configured to calculate calculating said fourth offset to be equal to $(((p3+p1+1)>>1)-p2+\Delta_{p1})>>1$, wherein >> denotes a right shift operation; and
said fifth offset calculator is configured to calculate said fifth offset to be equal to $(((q3+q1+1)>>1)-q2+\Delta_{q1})>>1$.

19. An encoder comprising a deblocking filter unit according to claim 10.

20. A network device being or belonging to a network node in a communication network between a sending unit and a receiving user equipment, said network device comprises an encoder according to claim 19.

21. A decoder comprising a deblocking filter unit according to claim 10.

22. A user equipment comprising:
a memory configured to store encoded video frames;
a decoder according to claim 21 configured to decode said encoded video frames into decoded video frames; and
a media player configured to render said decoded video frames into video data displayable on a display.

23. A network device being or belonging to a network node in a communication network between a sending unit and a receiving user equipment, said network device comprising a decoder according to claim 21.

24. A computer program product comprising a non-transitory computer readable medium and a computer program stored on said computer readable medium, said computer program for reducing blocking artifacts at a block boundary between a block of multiple pixels and a neighboring block of multiple pixels in a video frame, said computer program comprising code means which when run on a computer causes the computer to:
calculate a first offset to be equal to $(9\times(q0-p0)-3\times(q1-p1)+8)>>4$, wherein >> denotes a right shift operation, p0 denotes a pixel value of a pixel closest to said block boundary in a line of pixels in said block, wherein said line of pixels is perpendicular to said block boundary, p1 denotes a pixel value of a pixel next closest to said block boundary in said line of pixels, q0 denotes a pixel value of a pixel closest to said block boundary in a corresponding line of pixels in said neighboring block, wherein said corresponding line of pixels is perpendicular to said block boundary, and q1 denotes a pixel value of a pixel next closest to said block boundary in said corresponding line of pixels;

modify said pixel value of said pixel closest to said block boundary in said line of pixels by adding said first offset to said pixel value of said pixel closest to said block boundary in said line of pixels; and modify said pixel value of said pixel closest to said block boundary in said corresponding line of pixels by subtracting said first offset from said pixel value of said pixel closest to said block boundary in said corresponding line of pixels.

\* \* \* \* \*

UNITED STATES PATENT AND TRADEMARK OFFICE
CERTIFICATE OF CORRECTION

PATENT NO. : 8,526,509 B2
APPLICATION NO. : 13/583437
DATED : September 3, 2013
INVENTOR(S) : Norkin et al.

It is certified that error appears in the above-identified patent and that said Letters Patent is hereby corrected as shown below:

In the Specification

In Column 1, Line 51, delete "b c" and insert -- b, c --, therefor.

In Column 2, Line 33, delete "$d=|p2_2-2\times p1_2+p0_2|+\star q2_2-2\times q1_2+q0_2|+|p2_5-2\times p1_5+$" and insert -- $d = |p2_2 - 2\times p1_2 + p0_2| + |q2_2 - 2\times q1_2 + q0_2|+|p2_5 - 2\times p1_5+$ --, therefor In Column 6, Line 34, delete "$4(p2+p0+1)>>1)-p1+\Delta)>>1,$" and insert -- $(((p2+p0+1)>>1)-p1+\Delta)>>1,$ --, therefor.

In Column 7, Line 16, delete "$(((p3+p1+1)-1)>>p2+\Delta_{p1})>>1,$" and insert -- $(((p3+p1+1)>>1)-p2+\Delta_{p1})>>1,$ --, therefor.

In Column 14, Line 65, delete "$\Delta_q=(((q2+q0+1)>>1)-q1-\Delta)-1$" and insert -- $\Delta_q=(((q2+q0+1)>>1)-q1-\Delta)>>1$ --, therefor.

In Column 15, Line 15, delete "$\Delta_q=Clip3(-t_{C2},t_{C2},((q2+a0-((q1+\Delta)-1)+2)>>2))$" and insert -- $\Delta_q = Clip3(-t_{C2},t_{C2},((q2+a0 - ((q1+\Delta)<<1)+2)>>2))$ --, therefor.

In Column 15, Line 16, delete "wherein >>" and insert -- wherein << --, therefor.

In Column 15, Line 29, delete "$((p2+p0+\Delta-(p1-1)+1)>>1).$" and insert -- $((p2+p0+\Delta-(p1<<1)+1)>>1).$ --, therefor.

In Column 15, Line 33, delete "$((q2+q0-\Delta-(q1-1)+1)>>1).$" and insert -- $((q2+q0-\Delta-(q1<<1)+1)>>1).$ --, therefor.

In Column 21, Line 50, delete "a inverse" and insert -- an inverse --, therefor.

Signed and Sealed this
First Day of April, 2014

Michelle K. Lee
*Deputy Director of the United States Patent and Trademark Office*

CERTIFICATE OF CORRECTION (continued)
U.S. Pat. No. 8,526,509 B2

In the Claims

In Column 24, Line 34, in Claim 4, delete "A denotes" and insert -- $\Delta$ denotes --, therefor.

In Column 25, Line 66, in Claim 10, delete "(9×(q0–p0)–3×)q1-p1)+8)>>4," and insert -- $(9\times(q0-p0)-3\times(q1-p1)+8)>>4$, --, therefor.